(12) United States Patent
Wrobel et al.

(10) Patent No.: US 11,611,130 B2
(45) Date of Patent: Mar. 21, 2023

(54) LITHIUM LANTHANUM ZIRCONIUM OXIDE (LLZO) POWDER

(71) Applicant: 6K Inc., North Andover, MA (US)

(72) Inventors: Gregory Wrobel, Groveland, MA (US); Richard K. Holman, Wellesley, MA (US); Angshuman Pal, Lawrence, MA (US); Kamal Hadidi, Sudbury, MA (US)

(73) Assignee: 6K Inc., North Andover, MA (US)

( * ) Notice: Subject to any disclaimer, the term of this patent is extended or adjusted under 35 U.S.C. 154(b) by 240 days.

(21) Appl. No.: 16/861,973

(22) Filed: Apr. 29, 2020

(65) Prior Publication Data

US 2020/0350542 A1 Nov. 5, 2020

Related U.S. Application Data

(60) Provisional application No. 62/841,039, filed on Apr. 30, 2019.

(51) Int. Cl.
| | | |
|---|---|---|
| *H01M 4/02* | (2006.01) | |
| *H01M 50/431* | (2021.01) | |
| *H01M 4/62* | (2006.01) | |
| *H01M 10/0525* | (2010.01) | |
| *C01G 25/00* | (2006.01) | |

(52) U.S. Cl.
CPC ........ *H01M 50/431* (2021.01); *C01G 25/006* (2013.01); *H01M 4/62* (2013.01); *H01M 10/0525* (2013.01); *C01P 2002/02* (2013.01); *C01P 2002/30* (2013.01); *C01P 2002/54* (2013.01); *C01P 2004/02* (2013.01); *C01P 2004/32* (2013.01); *C01P 2004/62* (2013.01);
(Continued)

(58) Field of Classification Search
CPC ...................................................... H01M 4/02
See application file for complete search history.

(56) References Cited

U.S. PATENT DOCUMENTS

| | | |
|---|---|---|
| 1,699,205 A | 7/1925 | Podszus et al. |
| 2,892,215 A | 6/1959 | Naeser et al. |

(Continued)

FOREIGN PATENT DOCUMENTS

| | | |
|---|---|---|
| AU | 2014394102 B2 | 6/2020 |
| CA | 2947531 A1 | 11/2015 |

(Continued)

OTHER PUBLICATIONS

International Search Report & Written Opinion in International Application No. PCT/US2020/30510 dated Aug. 17, 2020 in 18 pages.

(Continued)

*Primary Examiner* — Jacob B Marks
(74) *Attorney, Agent, or Firm* — Knobbe, Martens, Olson & Bear, LLP

(57) ABSTRACT

Disclosed herein are embodiments of doped and undoped spherical or spheroidal lithium lanthanum zirconium oxide (LLZO) powder products, and methods of production using microwave plasma processing, which can be incorporated into solid state lithium ion batteries. Advantageously, embodiments of the disclosed LLZO powder display a high quality, high purity stoichiometry, small particle size, narrow size distribution, spherical morphology, and customizable crystalline structure.

17 Claims, 9 Drawing Sheets

(52) U.S. Cl.
CPC ...... *C01P 2004/64* (2013.01); *C01P 2006/40* (2013.01)

(56) References Cited

U.S. PATENT DOCUMENTS

| | | | |
|---|---|---|---|
| 3,290,723 A | 12/1966 | Jacques et al. | |
| 3,293,334 A | 12/1966 | Bylund et al. | |
| 3,434,831 A | 3/1969 | Knopp et al. | |
| 3,466,165 A | 9/1969 | Rhys et al. | |
| RE26,879 E | 5/1970 | Kelso | |
| 3,652,259 A | 3/1972 | Knopp | |
| 3,802,816 A | 4/1974 | Kaufmann | |
| 3,845,344 A | 10/1974 | Rainer | |
| 3,909,241 A | 9/1975 | Cheney et al. | |
| 3,966,374 A | 6/1976 | Honnorat et al. | |
| 3,974,245 A | 8/1976 | Cheney et al. | |
| 4,076,640 A | 2/1978 | Forgensi et al. | |
| 4,177,026 A | 12/1979 | Honnuchi et al. | |
| 4,212,837 A | 7/1980 | Oguchi et al. | |
| 4,221,554 A | 9/1980 | Oguchi et al. | |
| 4,423,303 A | 12/1983 | Hirose et al. | |
| 4,431,449 A | 2/1984 | Dillon et al. | |
| 4,439,410 A | 3/1984 | Santen et al. | |
| 4,544,404 A | 10/1985 | Yolton et al. | |
| 4,569,823 A | 2/1986 | Westin | |
| 4,599,880 A | 7/1986 | Stepanenko et al. | |
| 4,611,108 A | 9/1986 | Leprince et al. | |
| 4,670,047 A | 6/1987 | Kopatz et al. | |
| 4,692,584 A | 9/1987 | Caneer, Jr. | |
| 4,705,560 A | 11/1987 | Kemp, Jr. et al. | |
| 4,711,660 A | 12/1987 | Kemp, Jr. et al. | |
| 4,711,661 A | 12/1987 | Kemp, Jr. et al. | |
| 4,714,587 A | 12/1987 | Eylon et al. | |
| 4,731,110 A | 3/1988 | Kopatz et al. | |
| 4,731,111 A | 3/1988 | Kopatz et al. | |
| 4,772,315 A | 9/1988 | Johnson et al. | |
| 4,778,515 A | 10/1988 | Kemp, Jr. et al. | |
| 4,780,131 A | 10/1988 | Kemp, Jr. et al. | |
| 4,783,216 A | 11/1988 | Kemp, Jr. et al. | |
| 4,783,218 A | 11/1988 | Kemp, Jr. et al. | |
| 4,787,934 A | 11/1988 | Johnson et al. | |
| 4,802,915 A | 2/1989 | Kopatz et al. | |
| 4,836,850 A | 6/1989 | Kemp, Jr. et al. | |
| 4,859,237 A | 8/1989 | Johnson et al. | |
| 4,923,509 A | 5/1990 | Kemp, Jr. et al. | |
| 4,943,322 A | 7/1990 | Kemp, Jr. et al. | |
| 4,944,797 A | 7/1990 | Kemp et al. | |
| 4,952,389 A | 8/1990 | Szymanski et al. | |
| 5,041,713 A | 8/1991 | Weidman | |
| 5,095,048 A | 3/1992 | Takahashi et al. | |
| 5,114,471 A | 5/1992 | Johnson et al. | |
| 5,200,595 A | 4/1993 | Boulos et al. | |
| 5,290,507 A | 3/1994 | Runkle | |
| 5,292,370 A | 3/1994 | Tsai et al. | |
| 5,431,967 A | 7/1995 | Manthiram et al. | |
| 5,958,361 A | 9/1999 | Laine et al. | |
| 5,989,648 A | 11/1999 | Phillips | |
| 6,221,125 B1 | 4/2001 | Soda et al. | |
| 6,261,484 B1 | 7/2001 | Phillips et al. | |
| 6,274,110 B1 | 8/2001 | Kim et al. | |
| 6,329,628 B1 | 12/2001 | Kuo et al. | |
| 6,334,882 B1 | 1/2002 | Aslund | |
| 6,409,851 B1 | 6/2002 | Sethuram et al. | |
| 6,428,600 B1 | 8/2002 | Flurschutz et al. | |
| 6,543,380 B1 | 4/2003 | Sung-Spritzl | |
| 6,551,377 B1 | 4/2003 | Leonhardt | |
| 6,569,397 B1 | 5/2003 | Yadav et al. | |
| 6,579,573 B2 | 6/2003 | Strutt et al. | |
| 6,589,311 B1 | 7/2003 | Han et al. | |
| 6,652,822 B2 | 11/2003 | Phillips et al. | |
| 6,676,728 B2 | 1/2004 | Han et al. | |
| 6,689,192 B1 | 2/2004 | Phillips et al. | |
| 6,755,886 B2 | 6/2004 | Phillips et al. | |
| 6,780,219 B2 | 8/2004 | Singh et al. | |
| 6,805,822 B2 | 10/2004 | Takei et al. | |
| 6,838,072 B1 | 1/2005 | Kong et al. | |
| 6,869,550 B2 | 3/2005 | Dorfman et al. | |
| 6,902,745 B2 | 6/2005 | Lee et al. | |
| 6,919,527 B2 | 7/2005 | Boulos et al. | |
| 6,989,529 B2 | 1/2006 | Wiseman | |
| 7,066,980 B2 | 6/2006 | Akimoto et al. | |
| 7,091,441 B1 | 8/2006 | Kuo | |
| 7,108,733 B2 | 9/2006 | Enokido | |
| 7,125,537 B2 | 10/2006 | Liao et al. | |
| 7,175,786 B2 | 2/2007 | Celikkaya et al. | |
| 7,182,929 B1 | 2/2007 | Singhal et al. | |
| 7,220,398 B2 | 5/2007 | Sutorik et al. | |
| 7,235,118 B2 | 6/2007 | Bouaricha et al. | |
| 7,297,310 B1 | 11/2007 | Peng et al. | |
| 7,297,892 B2 | 11/2007 | Kelley et al. | |
| 7,357,910 B2 | 4/2008 | Phillips et al. | |
| 7,368,130 B2 | 5/2008 | Kim et al. | |
| 7,374,704 B2 | 5/2008 | Che et al. | |
| 7,375,303 B2 | 5/2008 | Twarog | |
| 7,431,750 B2 | 10/2008 | Liao et al. | |
| 7,442,271 B2 | 10/2008 | Asmussen et al. | |
| 7,491,468 B2 | 2/2009 | Okada et al. | |
| 7,517,513 B2 | 4/2009 | Sarkas et al. | |
| 7,524,353 B2 | 4/2009 | Johnson, Jr. et al. | |
| 7,572,315 B2 | 8/2009 | Boulos et al. | |
| 7,629,553 B2 | 12/2009 | Fanson et al. | |
| 7,700,152 B2 | 4/2010 | Laine et al. | |
| 7,776,303 B2 | 8/2010 | Hung et al. | |
| 7,806,077 B2 | 10/2010 | Lee et al. | |
| 7,828,999 B2 | 11/2010 | Yubuta et al. | |
| 7,901,658 B2 | 3/2011 | Weppner et al. | |
| 7,931,836 B2 | 4/2011 | Xie et al. | |
| 8,043,405 B2 | 10/2011 | Johnson, Jr. et al. | |
| 8,092,941 B2 | 1/2012 | Weppner et al. | |
| 8,168,128 B2 | 5/2012 | Seeley et al. | |
| 8,211,388 B2 | 7/2012 | Woodfield et al. | |
| 8,268,230 B2 | 9/2012 | Cherepy et al. | |
| 8,303,926 B1 | 11/2012 | Luhrs et al. | |
| 8,329,090 B2 | 12/2012 | Hollingsworth et al. | |
| 8,389,160 B2 | 3/2013 | Venkatachalam et al. | |
| 8,439,998 B2 | 5/2013 | Ito et al. | |
| 8,449,950 B2 | 5/2013 | Shang et al. | |
| 8,478,785 B2 | 7/2013 | Jamjoom et al. | |
| 8,658,317 B2 | 2/2014 | Weppner et al. | |
| 8,748,785 B2 | 6/2014 | Jordan et al. | |
| 8,784,706 B2 | 7/2014 | Shevchenko et al. | |
| 8,840,701 B2 | 9/2014 | Borland et al. | |
| 8,877,119 B2 | 11/2014 | Jordan et al. | |
| 8,911,529 B2 | 12/2014 | Withers et al. | |
| 8,951,496 B2 | 2/2015 | Hadidi et al. | |
| 8,968,669 B2 | 3/2015 | Chen | |
| 9,023,259 B2 | 5/2015 | Hadidi et al. | |
| 9,067,264 B2 | 6/2015 | Moxson et al. | |
| 9,079,778 B2 | 7/2015 | Kelley et al. | |
| 9,085,490 B2 | 7/2015 | Taylor et al. | |
| 9,101,982 B2 | 8/2015 | Aslund | |
| 9,196,901 B2 | 11/2015 | Se-Hee et al. | |
| 9,206,085 B2 | 12/2015 | Hadidi et al. | |
| 9,242,224 B2 | 1/2016 | Redjdal et al. | |
| 9,259,785 B2 | 2/2016 | Hadidi et al. | |
| 9,321,071 B2 | 4/2016 | Jordan et al. | |
| 9,322,081 B2 | 4/2016 | McHugh et al. | |
| 9,421,612 B2 | 8/2016 | Fang et al. | |
| 9,624,565 B2 | 4/2017 | Lee et al. | |
| 9,630,162 B1 | 4/2017 | Sunkara et al. | |
| 9,643,891 B2 | 5/2017 | Hadidi et al. | |
| 9,718,131 B2 | 8/2017 | Boulos et al. | |
| 9,751,129 B2 | 9/2017 | Boulos et al. | |
| 9,768,033 B2 | 9/2017 | Ranjan et al. | |
| 9,782,791 B2 | 10/2017 | Redjdal et al. | |
| 9,782,828 B2 | 10/2017 | Wilkinson | |
| 9,796,019 B2 | 10/2017 | She et al. | |
| 9,796,020 B2 | 10/2017 | Aslund | |
| 9,871,248 B2 | 1/2018 | Rayner et al. | |
| 9,879,344 B2 | 1/2018 | Lee et al. | |
| 9,899,674 B2 | 2/2018 | Hirai et al. | |
| 9,932,673 B2 | 4/2018 | Jordan et al. | |
| 9,945,034 B2 | 4/2018 | Yao et al. | |
| 9,981,284 B2 | 5/2018 | Guo et al. | |

(56) References Cited

U.S. PATENT DOCUMENTS

| | | |
|---|---|---|
| 9,999,922 B1 | 6/2018 | Struve |
| 10,050,303 B2 | 8/2018 | Anandan et al. |
| 10,065,240 B2 | 9/2018 | Chen |
| 10,130,994 B2 | 11/2018 | Fang et al. |
| 10,167,556 B2 | 1/2019 | Ruzic et al. |
| 10,244,614 B2 | 3/2019 | Foret |
| 10,333,183 B2 | 6/2019 | Sloop |
| 10,350,680 B2 | 7/2019 | Yamamoto et al. |
| 10,442,000 B2 | 10/2019 | Fukada et al. |
| 10,477,665 B2 | 11/2019 | Hadidi |
| 10,493,524 B2 | 12/2019 | She et al. |
| 10,529,486 B2 | 1/2020 | Nishisaka |
| 10,543,534 B2 | 1/2020 | Hadidi et al. |
| 10,610,929 B2 | 4/2020 | Fang et al. |
| 10,638,592 B2 | 4/2020 | Foret |
| 10,639,712 B2 | 5/2020 | Barnes et al. |
| 10,647,824 B2 | 5/2020 | Hwang et al. |
| 10,655,206 B2 | 5/2020 | Moon et al. |
| 10,668,566 B2 | 6/2020 | Smathers et al. |
| 10,669,437 B2 | 6/2020 | Cox et al. |
| 10,688,564 B2 | 6/2020 | Boulos et al. |
| 10,717,150 B2 | 7/2020 | Aleksandrov et al. |
| 10,744,590 B2 | 8/2020 | Maier et al. |
| 10,892,477 B2 | 1/2021 | Choi et al. |
| 10,943,744 B2 | 3/2021 | Sungail et al. |
| 10,987,735 B2 | 4/2021 | Hadidi et al. |
| 11,072,533 B2 | 7/2021 | Shevchenko et al. |
| 11,077,524 B2 | 8/2021 | Smathers et al. |
| 11,130,175 B2 | 9/2021 | Parrish et al. |
| 11,148,202 B2 | 10/2021 | Hadidi et al. |
| 11,273,322 B2 | 3/2022 | Zanata et al. |
| 11,273,491 B2 | 3/2022 | Barnes et al. |
| 11,311,938 B2 | 4/2022 | Badwe et al. |
| 2002/0112794 A1 | 8/2002 | Sethuram et al. |
| 2003/0172772 A1 | 9/2003 | Sethuram et al. |
| 2003/0207978 A1 | 11/2003 | Yadav et al. |
| 2004/0045807 A1 | 3/2004 | Sarkas et al. |
| 2004/0123699 A1 | 7/2004 | Liao et al. |
| 2005/0025698 A1 | 2/2005 | Talbot et al. |
| 2005/0163696 A1 | 7/2005 | Uhm et al. |
| 2005/0242070 A1 | 11/2005 | Hammer |
| 2006/0145124 A1 | 7/2006 | Hsiao et al. |
| 2006/0291827 A1 | 12/2006 | Suib et al. |
| 2007/0089860 A1 | 4/2007 | Hou et al. |
| 2007/0259768 A1 | 11/2007 | Kear et al. |
| 2008/0029485 A1 | 2/2008 | Kelley et al. |
| 2008/0182114 A1 | 7/2008 | Kim et al. |
| 2008/0296268 A1 | 12/2008 | Mike et al. |
| 2009/0074655 A1 | 3/2009 | Suciu |
| 2009/0093553 A1 | 4/2009 | Jager et al. |
| 2009/0155689 A1 | 6/2009 | Zaghib et al. |
| 2010/0007162 A1 | 1/2010 | Han et al. |
| 2010/0096362 A1 | 4/2010 | Hirayama et al. |
| 2010/0176524 A1 | 7/2010 | Burgess et al. |
| 2012/0027955 A1 | 2/2012 | Sunkara et al. |
| 2012/0034135 A1 | 2/2012 | Risby |
| 2012/0051962 A1 | 3/2012 | Imam et al. |
| 2012/0074342 A1 | 3/2012 | Kim et al. |
| 2012/0100438 A1 | 4/2012 | Fasching et al. |
| 2012/0230860 A1 | 9/2012 | Ward-Close et al. |
| 2012/0240726 A1 | 9/2012 | Kim et al. |
| 2012/0294919 A1 | 11/2012 | Jaynes et al. |
| 2013/0032753 A1 | 2/2013 | Yamamoto et al. |
| 2013/0071284 A1 | 3/2013 | Kano et al. |
| 2013/0078508 A1 | 3/2013 | Tolbert et al. |
| 2014/0202286 A1 | 7/2014 | Yokoyama et al. |
| 2014/0272430 A1 | 9/2014 | Kalayaraman |
| 2015/0000844 A1 | 1/2015 | Woo |
| 2015/0101454 A1 | 4/2015 | Shimizu et al. |
| 2015/0255767 A1* | 9/2015 | Aetukuri ............... H01M 12/08 |
| | | 429/247 |
| 2015/0259220 A1 | 9/2015 | Rosocha et al. |
| 2015/0333307 A1* | 11/2015 | Thokchom ......... H01M 10/0585 |
| | | 427/126.3 |
| 2016/0285090 A1 | 9/2016 | Ozkan et al. |
| 2016/0308244 A1* | 10/2016 | Badding ............ H01M 10/0525 |
| 2016/0332232 A1 | 11/2016 | Forbes Jones et al. |
| 2016/0351910 A1 | 12/2016 | Albano et al. |
| 2017/0009328 A1 | 1/2017 | Germann et al. |
| 2017/0120339 A1 | 5/2017 | Aslund |
| 2017/0125842 A1* | 5/2017 | Meguro ............ H01M 10/0585 |
| 2017/0151609 A1 | 6/2017 | Elsen et al. |
| 2017/0176977 A1 | 6/2017 | Huang et al. |
| 2017/0263975 A1 | 9/2017 | Anandan et al. |
| 2017/0368604 A1 | 12/2017 | Wilkinson |
| 2017/0373344 A1 | 12/2017 | Hadidi et al. |
| 2018/0104745 A1 | 4/2018 | L'Esperance et al. |
| 2018/0277849 A1 | 9/2018 | Gayden |
| 2018/0366707 A1 | 12/2018 | Johnson et al. |
| 2019/0001416 A1 | 1/2019 | Larouche et al. |
| 2019/0061005 A1 | 2/2019 | Kelkar |
| 2019/0084290 A1 | 3/2019 | Stoyanov et al. |
| 2019/0127835 A1 | 5/2019 | Yang et al. |
| 2019/0160528 A1 | 5/2019 | McGee et al. |
| 2019/0173130 A1 | 6/2019 | Schuhmacher et al. |
| 2019/0218650 A1 | 7/2019 | Subramanian et al. |
| 2019/0271068 A1 | 9/2019 | Sungail et al. |
| 2019/0292441 A1 | 9/2019 | Hill et al. |
| 2019/0348202 A1 | 11/2019 | Sachdev et al. |
| 2020/0203706 A1 | 6/2020 | Holman et al. |
| 2020/0207668 A1 | 7/2020 | Cavalli et al. |
| 2020/0215606 A1 | 7/2020 | Barnes et al. |
| 2020/0276638 A1 | 9/2020 | King et al. |
| 2020/0288561 A1 | 9/2020 | Huh |
| 2020/0314991 A1 | 10/2020 | Duanmu et al. |
| 2020/0335754 A1 | 10/2020 | Ramasubramanian et al. |
| 2020/0346287 A1 | 11/2020 | Badwe et al. |
| 2020/0358096 A1 | 11/2020 | Paulsen et al. |
| 2020/0391295 A1 | 12/2020 | Dorval et al. |
| 2021/0075000 A1 | 3/2021 | Holman et al. |
| 2021/0078072 A1 | 3/2021 | Barnes et al. |
| 2021/0085468 A1 | 3/2021 | Ryd et al. |
| 2021/0129216 A1 | 5/2021 | Barnes et al. |
| 2021/0146432 A1 | 5/2021 | Badwe et al. |
| 2021/0187607 A1 | 6/2021 | Badwe et al. |
| 2021/0252599 A1 | 8/2021 | Hadidi et al. |
| 2021/0276094 A1 | 9/2021 | Sobu et al. |
| 2021/0296731 A1 | 9/2021 | Wrobel et al. |
| 2021/0367264 A1 | 11/2021 | Hadidi et al. |
| 2021/0408533 A1 | 12/2021 | Holman et al. |
| 2022/0041457 A1 | 2/2022 | Pullen et al. |
| 2022/0095445 A1 | 3/2022 | Shang et al. |
| 2022/0118517 A1 | 4/2022 | Hadidi et al. |
| 2022/0134431 A1 | 5/2022 | Badwe et al. |
| 2022/0223379 A1 | 7/2022 | Holman et al. |
| 2022/0228288 A1 | 7/2022 | Holman et al. |
| 2022/0267216 A1 | 8/2022 | Holman et al. |

FOREIGN PATENT DOCUMENTS

| | | |
|---|---|---|
| CN | 1653869 A | 8/2005 |
| CN | 1675785 A | 9/2005 |
| CN | 1967911 A | 5/2007 |
| CN | 101716686 B | 2/2011 |
| CN | 102394290 A | 3/2012 |
| CN | 102179521 B | 1/2013 |
| CN | 103402921 A | 11/2013 |
| CN | 102554242 B | 12/2013 |
| CN | 103874538 A | 6/2014 |
| CN | 104084592 A | 10/2014 |
| CN | 104209526 A | 12/2014 |
| CN | 104485452 A | 4/2015 |
| CN | 103515590 B | 9/2015 |
| CN | 105514373 A | 4/2016 |
| CN | 104772473 B | 9/2016 |
| CN | 106493350 A | 3/2017 |
| CN | 108217612 A | 6/2018 |
| CN | 111970807 A | 11/2020 |
| EP | 0 256 233 A2 | 2/1988 |
| EP | 2 292 557 A1 | 3/2011 |
| EP | 3 143 838 A1 | 3/2017 |
| JP | 10-172564 A | 6/1998 |
| JP | 2004-505761 A | 2/2004 |
| JP | 2004-362895 A | 12/2004 |

(56) References Cited

FOREIGN PATENT DOCUMENTS

| | | |
|---|---|---|
| JP | 2007-138287 A | 6/2007 |
| JP | 2007-238402 A | 9/2007 |
| JP | 2011-108406 A | 6/2011 |
| JP | 2017-524628 A | 8/2017 |
| JP | 2018-190563 A | 11/2018 |
| KR | 10-1133094 B1 | 4/2012 |
| KR | 2018-0001799 A | 1/2018 |
| TW | 521539 B | 2/2003 |
| WO | WO 2005/039752 A1 | 5/2005 |
| WO | WO 2011/082596 A1 | 7/2011 |
| WO | WO 2012/144424 A1 | 10/2012 |
| WO | 2014/153318 A1 | 9/2014 |
| WO | WO 2015/064633 A1 | 5/2015 |
| WO | WO 2015/174949 A1 | 11/2015 |
| WO | WO 2016/048862 A1 | 3/2016 |
| WO | WO 2017/091543 A1 | 6/2017 |
| WO | WO 2017/106601 A8 | 6/2017 |
| WO | WO 2017/177315 A1 | 10/2017 |
| WO | WO 2017/223482 A1 | 12/2017 |
| WO | WO 2018/141082 A1 | 8/2018 |
| WO | WO 2019/045923 A1 | 3/2019 |
| WO | WO 2019/095039 A1 | 5/2019 |
| WO | WO 2019/139773 A1 | 7/2019 |
| WO | WO 2019/243870 A1 | 12/2019 |
| WO | WO 2019/246242 A1 | 12/2019 |
| WO | WO 2019/246257 A1 | 12/2019 |
| WO | WO 2020/009955 A1 | 1/2020 |
| WO | WO 2020/091854 A1 | 5/2020 |
| WO | WO 2020/132343 A1 | 6/2020 |
| WO | WO 2020/223358 A1 | 11/2020 |
| WO | WO 2020/223374 A1 | 11/2020 |
| WO | WO 2021/046249 A1 | 3/2021 |
| WO | WO 2021/118762 A1 | 6/2021 |
| WO | WO 2021/127132 A1 | 6/2021 |
| WO | WO 2021/263273 A1 | 12/2021 |
| WO | 2022/032301 A1 | 2/2022 |
| WO | 2022/067303 A1 | 3/2022 |

OTHER PUBLICATIONS

"Build Boldly", Technology Demonstration, 6K Additive, [publication date unknown], in 11 pages.

Ajayi, B. et al., "A rapid and scalable method for making mixed metal oxide alloys for enabling accelerated materials discovery", Journal of Materials Research, Jun. 2016, vol. 31, No. 11, pp. 1596-1607.

Boulos, M., "The inductively coupled radio frequency plasma", Journal of High Temperature Material Process, 1997, vol. 1, pp. 17-39.

Boulos, M., "Induction Plasma Processing of Materials for Powders, Coating, and Near-Net-Shape Parts", Advanced Materials & Processes, Aug. 2011, pp. 52-53, in 3 pages.

Carreon, H. et al., "Study of Aging Effects in a Ti—6Al—4V alloy with Widmanstatten and Equiaxed Microstructures by Non-destructive Means", AIP Conference Proceedings 1581, 2014 (published online Feb. 17, 2015), pp. 739-745.

Chang, S. et al., "One-Step Fast Synthesis of $Li_4Ti_5O_{12}$ Particles Using an Atmospheric Pressure Plasma Jet", Journal of the American Ceramic Society, Dec. 26, 2013, vol. 97, No. 3, pp. 708-712.

Chen, G. et al., "Spherical Ti—6Ak—4V Powders Produced by Gas Atomization", Key Engineering Materials, vol. 704, Aug. 2016, pp. 287-292. URL: https://www.scientific.net/KEM.704.287.

Chikumba, S. et al., "High Entropy Alloys: Development and Applications", 7th International Conference on Latest Trends in Engineering & Technology (ICLTET'2015), Nov. 26-27, 2015, Irene, Pretoria (South Africa), pp. 13-17.

Dolbec, R., "Recycling Spherical Powders", Presented at Titanium 2015, Orlando, FL, Oct. 2015, in 20 pages.

Fuchs, G.E. et al., "Microstructural evaluation of as-solidified and heat-treated γ-TiAl based powders", Materials Science and Engineering, 1992, A152, pp. 277-282.

He, J. Y. et al., "A precipitation-hardened high-entropy alloy with outstanding tensile properties", Acta Materialia, 2016, vol. 102, pp. 187-196.

Ivasishin, O. M. et al., "Innovative Process for Manufacturing Hydrogenated Titanium Powder for Solid State Production of P/M Titanium Alloy Components", Titanium 2010, Oct. 3-6, 2010, in 27 pages.

Jia, H. et al., "Hierarchical porous silicon structures with extraordinary mechanical strength as high-performance lithium-ion battery anodes", Nature Communications, Mar. 2020, vol. 11, in 9 pages. URL: https://doi.org/10.1038/s41467-020-15217-9.

Ko, M. et al., "Challenges in Accommodating Volume Change of Si Anodes for Li-Ion Batteries", Chem Electro Chem, Aug. 2015, vol. 2, pp. 1645-1651. URL: https://doi.org/10.1002/celc.201500254.

Kotlyarov, V. I. et al, "Production of Spherical Powders on the Basis of Group IV Metals for Additive Manufacturing", Inorganic Materials: Applied Research, Pleiades Publishing, May 2017, vol. 8, No. 3, pp. 452-458.

Laine, R. M. et al., "Making nanosized oxide powders from precursors by flame spray pyrolysis", Key Engineering Materials, Jan. 1999, vol. 159-160, pp. 17-24.

Li, X. et al., "Mesoporous silicon sponge as an anti-pulverization structure for high-performance lithium-ion battery anodes", Nature Communications, Jul. 2014, vol. 5, Article No. 4105, in 7 pages. URL: https://doi.org/10.1038/ncomms5105.

Li, Z. et al., "Strong and Ductile Non-Equiatomic High-Entropy Alloys: Design, Processing, Microstructure, and Mechanical Properties", The Journal of The Minerals, Metals & Materials Society, Aug. 2017, vol. 69(1), pp. 2099-2106. URL: https://doi.org/10.1007/s11837-017-2540-2.

Lin, M., "Gas Quenching with Air Products' Rapid Gas Quenching Gas Mixture", Air Products, Dec. 31, 2007, in 4 pages. URL: https://www.airproducts.co.uk/-/media/airproducts/files/en/330/330-07-085-us-gas-quenching-with-air-products-rapid-gas-quenching-gas-mixture.pdf.

Muoto, C. et al., "Phase Homogeneity in $Y_2O_3$—MgO Nanocomposites Synthesized by Thermal Decomposition of Nitrate Precursors with Ammonium Acetate Additions", Journal of the American Ceramic Society, 2011, vol. 94(12), pp. 4207-4217.

Nyutu, E. et al., "Ultrasonic Nozzle Spray in Situ Mixing and Microwave-Assisted Preparation of Nanocrystalline Spinel Metal Oxides: Nickel Ferrite and Zinc Aluminate", Journal of Physical Chemistry C, Feb. 1, 2008, vol. 112, No. 5, pp. 1407-1414.

Ohta, R. et al., "Effect of PS-PVD production throughput on Si nanoparticles for negative electrode of lithium ion batteries", Journal of Physics D: Applied Physics, Feb. 2018, vol. 51(1), in 7 pages.

Or, T. et al., "Recycling of mixed cathode lithium-ion batteries for electric vehicles: Current status and future outlook", Carbon Energy, Jan. 2020, vol. 2, pp. 6-43. URL: https://doi.org/10.1002/cey2.29.

Popescu, G. et al., "New TiZrNbTaFe high entropy alloy used for medical applications", IOP Conference Series: Materials Science and Engineering, Mod Tech 2018, Sep. 2018, vol. 400, in 9 pages.

Reig, L. et al., "Microstructure and Mechanical Behavior of Porous Ti—6Al—4V Processed by Spherical Powder Sintering", Materials, Oct. 23, 2013, vol. 6, pp. 4868-4878.

Sastry, S.M.L. et al., "Rapid Solidification Processing of Titanium Alloys", Journal of Metals (JOM), Sep. 1983, vol. 35, pp. 21-28.

Savage, S. J. et al., "Production of rapidly solidified metals and alloys", Journal of Metals (JOM), Apr. 1984, vol. 36, pp. 20-33.

Sheng, Y. et al., "Preparation of Spherical Tungsten Powder by RF Induction Plasma", Rare Metal Materials and Engineering, Nov. 2011, vol. 40, No. 11, pp. 2033-2037.

Sheng, Y. et al., "Preparation of Micro-spherical Titanium Powder by RF Plasma", Rare Metal Materials and Engineering, Jun. 2013, vol. 42, No. 6, pp. 1291-1294.

Suryanarayana, C., "Recent Developments in Mechanical Alloying", Reviews on Advanced Materials Science, Aug. 2008, vol. 18(3), pp. 203-211.

Suryanarayana, C. et al., "Rapid solidification processing of titanium alloys", International Materials Reviews, 1991, vol. 36, pp. 85-123.

(56) References Cited

OTHER PUBLICATIONS

Tang, H. P. et al., "Effect of Powder Reuse Times on Additive Manufacturing of Ti—6Al—4V by Selective Electron Beam Melting", JOM, Mar. 2015, vol. 67, pp. 555-563.
Van Laar, J. H. et al., "Spheroidisation of Iron Powder in a Microwave Plasma Reactor", Journal of the Southern African Institute of Mining and Metallurgy, Oct. 2016, vol. 116, No. 10, pp. 941-946.
Veith, M. et al., "Low temperature synthesis of nanocrystalline $Y_3Al_5O_{12}$ (YAG) and Cedoped $Y_3Al_5O_{12}$ via different sol-gel methods", The Journal of Materials Chemistry, Jan. 1999, vol. 9, pp. 3069-3079.
Wang, J. et al., "Preparation of Spherical Tungsten and Titanium Powders by RF Induction Plasma Processing", Rare Metals, Jun. 2015 (published online May 31, 2014), vol. 34, No. 6, pp. 431-435.
Wang, Y. et al., "Developments in Nanostructured Cathode Materials for High-Performance Lithium-Ion Batteries", Advanced Materials, Jun. 2008, pp. 2251-2269.
Yang, S. et al., "Preparation of Spherical Titanium Powders from Polygonal Titanium Hydride Powders by Radio Frequency Plasma Treatment", Materials Transactions, Nov. 2013, vol. 54, No. 12, pp. 2313-2316.
Zhang, K., Ph.D., "The Microstructure and Properties of Hipped Powder Ti Alloys", a thesis submitted to The University of Birmingham, College of Engineering and Physical Sciences, Apr. 2009, in 65 pages.
Zhang, Y. et al., "Microstructures and properties of high-entropy alloys", Progress in Materials Science, Apr. 2014 (available online Nov. 2013), vol. 61, pp. 1-93.
Zhang, Y. D. et al., "High-energy cathode materials for Li-ion batteries: A review of recent developments", Science China Technological Sciences, Sep. 2015, vol. 58(11), pp. 1809-1828.
International Preliminary Report on Patentability and Written Opinion, re PCT Application No. PCT/US2020/030510, dated Nov. 11, 2021.
Bobzin, K. et al., "Modelling and Diagnostics of Multiple Cathodes Plasma Torch System for Plasma Spraying", Frontiers of Mechanical Engineering, Sep. 2011, vol. 6, pp. 324-331.
Bobzin, K. et al., "Numerical and Experimental Determination of Plasma Temperature during Air Plasma Spraying with a Multiple Cathodes Torch", Journal of Materials Processing Technology, Oct. 2011, vol. 211, pp. 1620-1628.
Boulos, M., "Plasma power can make better powders", Metal Powder Report, May 2004, vol. 59(5), pp. 16-21.
Coldwell, D. M. et al., "The reduction of $SiO_2$ with Carbon in a Plasma", Journal of Electrochemical Society, Jan. 1977, vol. 124, pp. 1686-1689.
Gradl, P. et al., "GRCop-42 Development and Hot-fire Testing Using Additive Manufacturing Powder Bed Fusion for Channel-Cooled Combustion Chambers", 55th AIAA/SAE/ASEE Joint Propulsion Conference 2019, Aug. 2019, pp. 1-26.
Li, L. et al., "Spheroidization of silica powders by radio frequency inductively coupled plasma with Ar—H2 and Ar—N2 as the sheath gases at atmospheric pressure", International Journal of Minerals, Metallurgy, and Materials, Sep. 2017, vol. 24(9), pp. 1067-1074.
Moisan, M. et al., "Waveguide-Based Single and Multiple Nozzle Plasma Torches: the Tiago Concept", Plasma Sources Science and Technology, Jun. 2001, vol. 10, pp. 387-394.
Zielinski, A. et al., "Modeling and Analysis of a Dual-Channel Plasma Torch in Pulsed Mode Operation for Industrial, Space, and Launch Applications", IEEE Transactions on Plasma Science, Jul. 2015, vol. 43(7), pp. 2201-2206.
Ajayi, B. P. et al., "Atmospheric plasma spray pyrolysis of lithiated nickel-manganese-cobalt oxides for cathodes in lithium ion batteries", Chemical Engineering Science, vol. 174, Sep. 14, 2017, pp. 302-310.
Dearmitt, C., "26. Functional Fillers for Plastics", in Applied Plastics Engineering Handbook—Processing and Materials, ed., Myer Kutz, Elsevier, 2011, pp. 455-468.
Gleiman, S. et al., "Melting and spheroidization of hexagonal boron nitride in a microwave-powered, atmospheric pressure nitrogen plasma", Journal of Materials Science, Aug. 2002, vol. 37(16), pp. 3429-3440.
Houmes et al., "Microwave Synthesis of Ternary Nitride Materials", Journal of Solid State Chemistry, vol. 130, Issue 2, May 1997, pp. 266-271.
Majewksi, T., "Investigation of W—Re—Ni heavy alloys produced from plasma spheroidized powders", Solid State Phenomena, Mar. 2013, vol. 199, pp. 448-453.
Moldover, M. R. et al., "Measurement of the Universal Gas Constant R Using a Spherical Acoustic Resonator", Physical Review Letters, Jan. 1988, vol. 60(4), pp. 249-252.
Murugan et al. "Nanostructured a/β-tungsten by reduction of WO3 under microwave plasma", Int. Journal of Refractory Metals and Hard Materials 29 (2011) 128-133. (Year: 2011).
Nichols, F. A., "On the spheroidization of rod-shaped particles of finite length", Journal of Materials Science, Jun. 1976, vol. 11, pp. 1077-1082.
Park et al. "Preparation of spherical WTaMoNbV refractory high entropy alloy powder by inductively-coupled thermal plasma", Materials Letters 255 (2019) 126513 (Year: 2019).
Walter et al., "Microstructural and mechanical characterization of sol gel-derived Si—O—C glasses" Journal of the European Ceramic Society, vol. 22, Issue 13, Dec. 2002, pp. 2389-2400.
Zhang, X. et al., "High thickness tungsten coating with low oxygen content prepared by air plasma spray", Cailliao Gongcheng, 2014, vol. 5, pp. 23-28.
Zhang, Y. S. et al., "Core-shell structured titanium-nitrogen alloys with high strength, high thermal stability and good plasticity", Scientific Reports, Jan. 2017, vol. 7, in 8 pages.

\* cited by examiner

PRIOR ART

PRIOR ART

LITHIUM LANTHANUM ZIRCONIUM OXIDE (LLZO) POWDER

INCORPORATION BY REFERENCE TO ANY PRIORITY APPLICATIONS

This application claims benefit to U.S. Provisional Patent Application Ser. No. 62/841,039 entitled "LITHIUM LANTHANUM ZIRCONIUM OXIDE (LLZO) POWDER," filed on Apr. 30, 2019, the contents of which is hereby incorporated by reference in its entireties.

BACKGROUND

Field

The present disclosure is generally directed in some embodiments to doped and undoped spherical or spheroidal lithium lanthanum zirconium oxide (LLZO) powder products, and methods of production.

SUMMARY

Disclosed herein are embodiments of a high quality, high purity stoichiometric LLZO powder with a small particle size, narrow size distribution, and spherical morphology, and methods of making such powder. In some embodiments, the LLZO powder can comprise: LLZO particles; wherein the LLZO particles have a D50 between about 20 nm and about 500 nm, D10 of greater than or equal to D50÷4, and D90 less than or equal to D50×4; wherein the LLZO particles have a sphericity factor of greater than about 0.6, and wherein a structure of the LLZO particles is a crystalline garnet structure and/or an amorphous structure. In some embodiments, the D10 can be approximately equal to D50÷2. In some embodiments, the D90 can be approximately equal to D50×2. In some embodiments, the D50 can be between about 50 nm and about 500 nm. In some embodiments, the D50 can be between about 100 nm and about 400 nm. In some embodiments, the D50 can be between about 150 nm and about 300 nm. In some embodiments, the D50 can approximately equal 200 nm.

In some embodiments, the LLZO particles can have a stoichiometry of $Li_{7-3x}M1_xLa_3Zr_2O_{12}$, M1 is Al, B, or Ga, and x is about 0.1 to 0.3. In some embodiments, the LLZO particles can have a stoichiometry of $Li_{7-y}La_3Zr_{2-y}M2_yO_{12}$, M2 is Ta or Nb, and y greater than or equal to about 0.4. In some embodiments, the LLZO particles can have a stoichiometry of $Li_{7-3nx}M1_xLa_3Zr_{2-my}M2_yO_{12}$, M1 is a low atomic mass metal, x is about 0.1 to 0.3, and n can depend on the valence of M1. In some embodiments, the LLZO particles can have a stoichiometry of $Li_{7-3nx}M1_xLa_3Zr_{2-my}M2_yO_{12}$, y greater than or equal to about 0.4, and m can depend on the valence of M2.

In some embodiments, the LLZO particles can be crystalline. In some embodiments, the crystalline structure of the LLZO particles can be a garnet crystalline structure. In some embodiments, the garnet crystalline structure can be a garnet single crystalline structure. In some embodiments, the LLZO particles can be amorphous. In some embodiments, the LLZO particles can be a combination of amorphous and crystalline structure.

Also disclosed herein are embodiments of a solid state battery, the solid state battery can comprise: an anode; a cathode; a solid electrolyte, a separator, wherein either the anode, cathode or separator comprises LLZO particles; wherein the LLZO particles have a D50 between about 20 nm and about 500 nm, D10 of greater than or equal to D50÷4, and D90 less than or equal to D50×4; wherein the LLZO particles have a sphericity factor of greater than about 0.6, and wherein a structure of the LLZO particles is either a crystalline garnet structure or an amorphous structure.

In some embodiments, the anode can comprise the LLZO particles. In some embodiments, the cathode can comprise the LLZO particles. In some embodiments, the separator can comprise the LLZO particles. In some embodiments, the separator can be a composite or a ceramic non-composite separator.

Further disclosed herein are embodiments of a method of manufacturing a LLZO powder, the method can comprise: preparing a LLZO feedstock of metallic salts comprising lithium, lanthanum, zirconium, tantalum, and a dopant; introducing the LLZO feedstock into a microwave plasma torch, a plasma plume of the microwave plasma torch, and/or an exhaust of the microwave plasma torch; and pyrolyzing the LLZO feedstock within the microwave plasma torch, the plasma plume of the microwave plasma torch, and/or the exhaust of the microwave plasma torch to form spheroidized LLZO powder.

In some embodiments, the LLZO feedstock can be a solid feedstock. In some embodiments, the LLZO feedstock can be a liquid feedstock. In some embodiments, the dopant can be one or a combination of any of Al, B, Ga, Be, Fe, Zn, Ta, Nb, Tc, Ce, Ti, Sn, Mo, Ru, Hf, Mg, Sc, Mn, Ni, Cu, Co, Ir, Pt, and Pd. In some embodiments, the method can further comprise sintering the spheroidized LLZO powder.

DETAILED DESCRIPTION

Disclosed herein are embodiments of improved lithium lanthanum zirconium oxide (LLZO) powders and products, as well as methods, devices, and assemblies for utilizing LLZO material made through plasma processing. A promising class of ionically conductive ceramics for solid state battery cells are based on LLZO. These materials have room temperature ionic conductivities of up to $10^{-3}$ S/cm and have excellent electrochemical stability. Embodiments of the disclosure can be incorporated into solid state batteries, such as in separators, electrodes, anodes, and/or cathodes.

Current solid state batteries can include either a conventional non-composite separator or a composite separator. In both a non-composite separator and a composite separator, a fine particle sized, spherical particle morphology, and narrow particle size distribution are ideal, and embodiments of the disclosure can produce such particles.

In producing an ionic membrane separator, the powder can be consolidated into a thin membrane through different methods. In one of these methods, the powder can be mixed with an ionic conducting polymer to form a composite membrane separator. In another instance, the powder can be consolidated into a ribbon through sintering to make a non-composite separator. Both of these separators benefit from tight control over the particle size, particle size distribution, and high chemical purity, which is advantageously disclosed herein. In ceramic electrolyte non-composite separators, the material can be either amorphous or crystalline. In composite electrolyte separators, the material can be crystalline.

Figure 1:
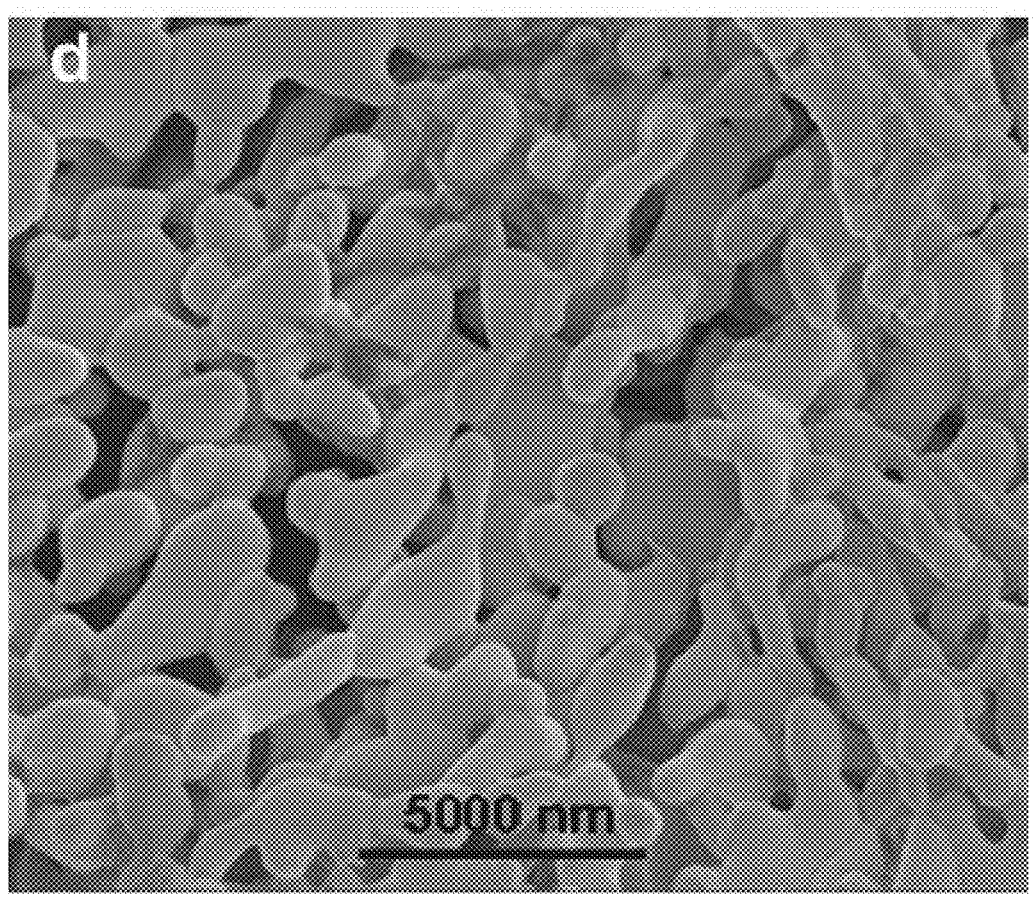
FIG. 1 illustrates an example of LLZO particles produced by sol-gel synthesis.

In conventional LLZO preparation, the powder is typically produced by solid state or sol-gel synthesis and then milled to size, which may be costly in terms of energy and yield, and produces irregular-shaped particles and large particle size distribution range, as shown in FIG. 1.

Figure 2:
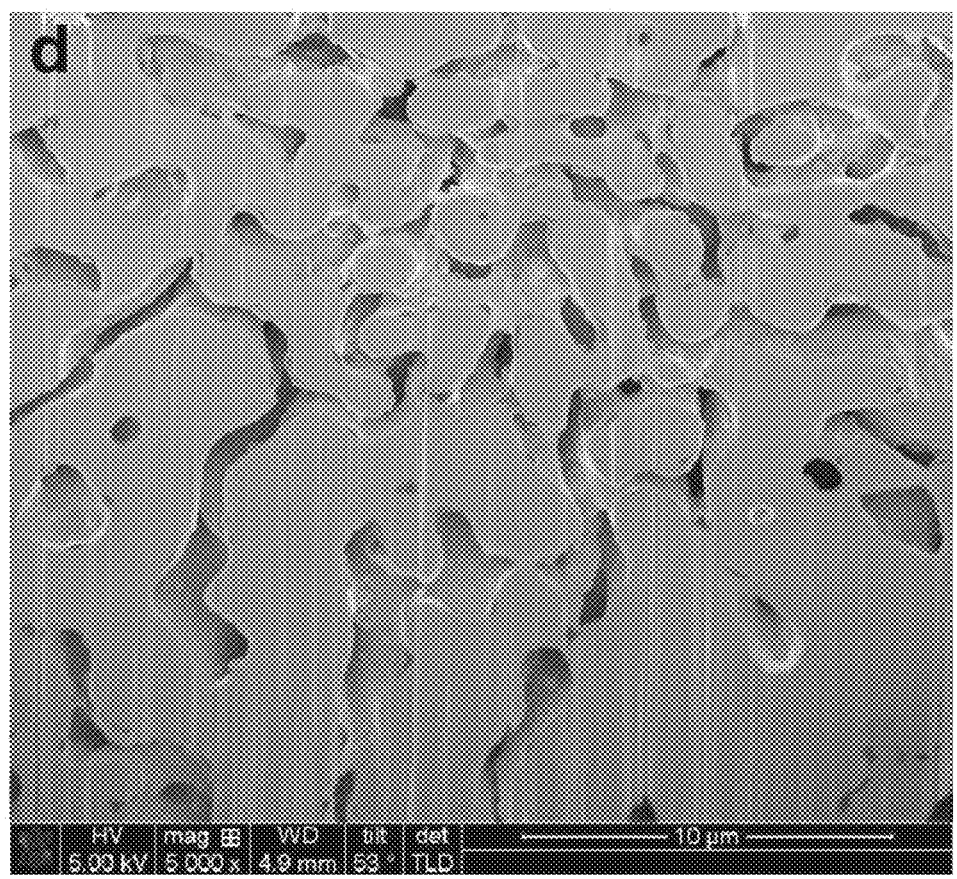
FIG. 2 illustrates an example of LLZO particles produced by spray pyrolysis.

Alternatively, companies have used spray pyrolysis in which a precursor solution is fed into a high temperature furnace. However, this method has limited control over process temperature uniformity and process environment. This leads to wide particle size distribution, phase impurities, and low particle densities making the material unsuitable for separator film usage as shown in FIG. 2.

In both cases, these characteristics lead to poor packing of material in green state, poor particle-to-particle contact, low driving force for sintering due to the large particle size, and poor coordination of particles with other particles. Green state can be defined as the particles after formation but before sintering. Rapid full density sintering of defect free separators may not occur when LLZO powder is produced via milling and/or spray pyrolysis. Separator films produced with LLZO prepared by these methods may have residual porosity and a large grain size distribution which may result in early failures.

Figure 3:
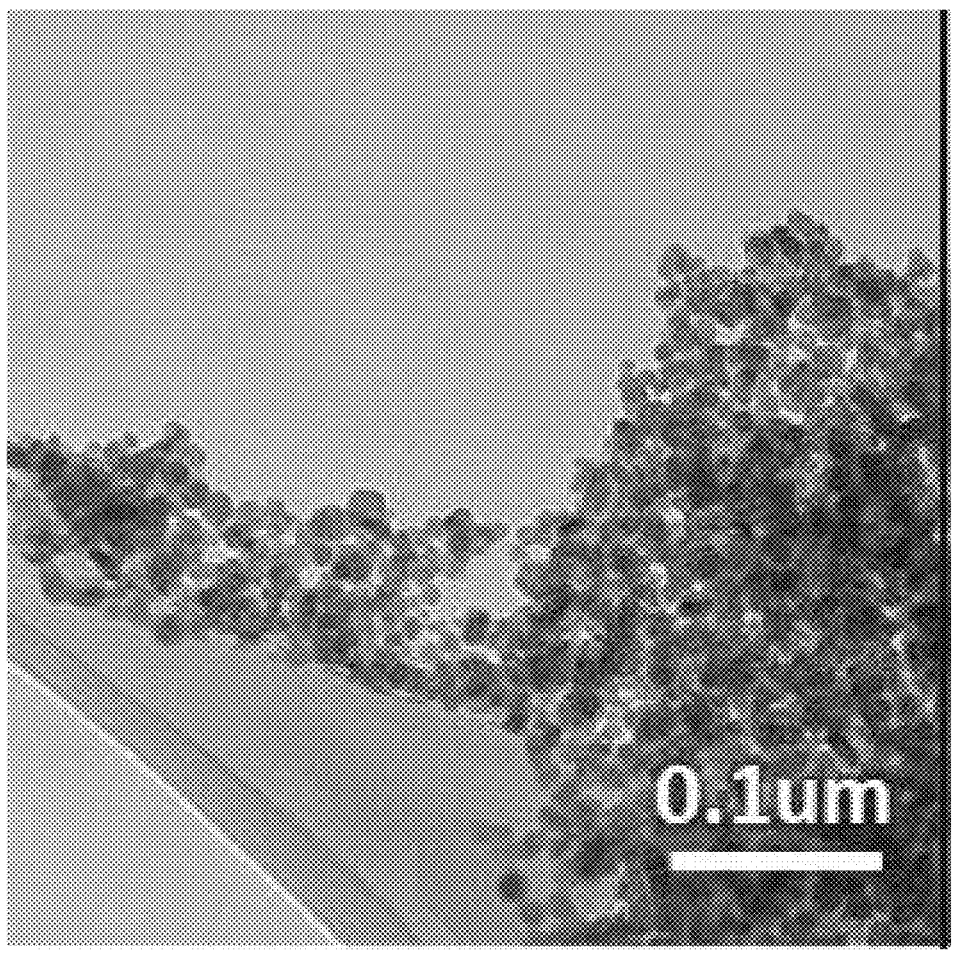
FIG. 3 illustrates an embodiment of LLZO nanoparticles produced by microwave enhanced plasma processing.

Embodiments of the disclosure relate to LLZO powder having small or narrow particle size, small or narrow size distribution, and a relatively spherical morphology, which can have advantageous properties for solid state batteries. Superior LLZO can be made using plasma processing, such as microwave plasma processing. LLZO which has been processed using plasma processing may be spherical particles with tight size distribution (for example, between 100-500 nm), desired stoichiometry, and varied crystal structure. An embodiment of microwave plasma processed LLZO can be seen in FIG. 3. As shown, the processed LLZO can have highly spherical nanoscale material that can be sinterable to high density.

In some embodiments, the particles can exhibit a crystalline structure. In some embodiments, the crystalline structure can be a garnet crystalline structure. In some embodiments, particles can be amorphous. In some embodiments, the particles can be a combination of crystalline and amorphous. In some embodiments, the particles can have phase purity (or generally have phase purity).

In some embodiments, the particles can be fully crystalline. In some embodiments, the particles can be 99% (or about 99%) crystalline (and therefore 1% amorphous). In some embodiments, the particles can be greater than 50, 60, 70, 75, 80, 85, 90, 95, or 99% crystalline (or about 50, about 60, about 70, about 75, about 80, about 85, about 90, about 95, or about 99% crystalline).

In some embodiments, the sphericity factor can be greater than 0.3, 0.4, 0.5, 0.6, 0.7, or 0.8 (or greater than about 0.3, about 0.4, about 0.5, about 0.6, about 0.7, or about 0.8). In some embodiments, the sphericity factor can be less than 0.3, 0.4, 0.5, 0.6, 0.7, or 0.8 (or less than about 0.3, about 0.4, about 0.5, about 0.6, about 0.7, or about 0.8).

In some embodiments the particle size of the powder can be D50 tunable between 20 nm and 500 nm (or between about 20 nm and about 500 nm), between 50 nm and 500 nm (or between about 50 nm and about 500 nm), between 100 nm and 400 nm (or between about 100 nm and about 400 nm), or between about 150 nm and about 300 nm (or between about 150 nm to about 300 nm). In some embodiments, the D50 of the particles can be 200 nm (or about 200 nm). In some embodiments, D10 can be D50÷4. In some embodiments, the D10 can be D50÷2. In some embodiments, D90 can be D50×4. In some embodiments, D90 can be D50×2. For example, if D50 is 200 nm D50÷2 will be 100 nm, D50÷4 will be 50 nm, D50×4 will be 800 nm, and D50×2 will be 400 nm. D10 can be defined as the diameter at which 10% of the LLZO powder is comprised of particles with a diameter less than this value. D50 can be defined as the diameter at which 50% of the LLZO mass is comprised of particles with a diameter less than this value. D90 can be defined as the diameter at which 90% of the LLZO mass is comprised of particles with a diameter less than this value.

In some embodiments, the stoichiometry of the powder can be tunable within the formula $Li_{7-nx}M1_xLa_3Zr_{2-my}M2_yO_{12}$, where n and m can depend upon the valence of M1 and M2. In some embodiments, M1 and M2 can be any element on the periodic table. In some embodiments, M1 is a low atomic mass metal such as Al, B, Ga, Be, Fe, and Zn, and M2 can be Ta, Nb, Tc, Ce, Ti, Sn, Mo, Ru, Hf, Mg, Sc, Mn, Ni, Cu, Co, Ir, Pt, and Pd. In some embodiments, when M1 is a low atomic mass metal such as Al, B, or Ga, the stoichiometry can be controlled according to the formula $Li_{7-3x}M1_xLa_3Zr_2O_{12}$ when x=0.1-0.3. In some embodiments, when M2 is a pentavalent metal such as Ta or Nb, the stoichiometry can be controlled according to the formula $Li_{7-y}La_3Zr_{2-y}M2_yO_{12}$ when y≥0.4. In some embodiments, B is used as the dopant to make a stoichiometry of $Li_{7-3x}B_xLa_3Zr_2O_{12}$ when x=0.1-0.3. In some embodiments, the stoichiometry of the powder can be $Li_{6.75}La_3Zr_{2.53}O_{12}$. In some embodiments, a garnet crystalline structure can be formed using an M1 dopant.

In some embodiments, plasma processed LLZO can have a fine particle size which exhibits a greater driving force that densifies the material during sintering which promotes shorter sintering times and a lower temperature compared with traditionally prepared LLZO materials. The tight particle size distribution and spherical morphology can allow for high packing fraction which speeds up sintering. Short sintering time and low sintering temperature can lead to plasma processed LLZO being suitable for pressureless sintering.

Further, the tight particle size and spherical morphology can reduce the occurrence of stable pores that cannot be sintered out. Less stable pores can lead to an increase in end quality of the material. The tight size distribution can also lead to controlled grain growth which prevents abnormal growth that creates excessively large grains and broad grain size distribution.

In some embodiments, sintering can be performed to greater than 98.5% density with a maximum grain size of less than or equal to 2 μm. In some embodiments the porosity after sintering can be less than 5, 4, 3, 2, 1, or 0.5 (or less than about 5, about 4, about 3, about 2, about 1, or about 0.5)%. In some embodiments the porosity after sintering can be greater than 5, 4, 3, 2, 1, or 0.5 (or greater than about 5, about 4, about 3, about 2, about 1, or about 0.5)%. In some embodiments, the ionic conductivity of the plasma processed LLZO can be $10^{-3}$ S/cm after sintering.

Feedstock

In some embodiments, the feedstock used to produce the ionic conducting LLZO material can be metallic salts of the relevant elements such as nitrates and acetate of lithium, lanthanum, zirconium, tantalum, and aluminum. These salts can be dissolved and mixed at the right proportion to procure the desired stoichiometry. In some embodiments, a mixture of metallic salts can be used.

In some embodiments, nitrates of lanthanum, lithium, and aluminum can be mixed with acetates of zirconium to produce the solution feedstock and to produce the desired stoichiometry. In some embodiments, lithium hydroxide can be used as opposed to lithium nitrate to increase the lithium percentage in the salt.

In some embodiments, lithium or lanthanum may be vaporized during processing which can decrease the yield of metal in the final product. The amount of metallic salt can be increased to make up for the vaporized metal.

In some embodiments, other feedstocks used to produce ionically conducting LLZO material can be non-lithium containing ceramic powder particles of sizes ranging from 20-1000 nm mixed with a dispersion medium and in a carrier solution to produce a dispersion, suspension, slurry, or similar mixture. The carrier solution can be water, alcohols, or other non-polar solvents.

In some embodiments, lithium carbonate can be partially dissolved in the carrier solution and mixed with stoichiometric ratios of lanthanum oxide, zirconium oxide, and aluminum oxide mixed in water and a dispersion medium such as Triton X to form a stable suspension. In some embodiments, the dispersion or slurry can contain a combination of ceramic oxide powder mixed with a soluble metallic salt. Lithium nitrate and lanthanum nitrate can be mixed with zirconium and aluminum oxides in water to form a slurry.

Processing Steps

Precursor Creation

The process can start by dissolving the metallic salts of interest of lithium, lanthanum, zirconium, and dopants, such as aluminum, in stoichiometric proportions in a solvent such as water or in the case of dispersions, dispersing the powders in the carrier solution. The quantity of each salt can be calculated to give the desired final stoichiometry of the LLZO material to be made. In some embodiments, if making $Li_7La_3Zr_3O_{12}$, the amount of lithium salt would be calculated to yield seven moles of lithium, the amount of lanthanum salt would be calculated to yield 3 moles of lanthanum, the amount of zirconium salt would be calculated to yield 2 mole of zirconium in the final LLZO product.

In the case of dopants, stoichiometry of the formula can be adjusted accordingly. In some embodiments, aluminum takes the place of lithium in the LLZO structure. Lithium can be decreased from the feedstock in an equal proportion to aluminum added to the feedstock, following the formula $Li_{7-3x}Al_xLa_3Zr_2O_{12}$ where x=0.1-0.3. If 0.25 mole of aluminum is desired as a dopant, the lithium concentration can be reduced from 7 moles to 6.25 moles to maintain both stoichiometry and charge neutrality.

In some embodiments, lithium or lanthanum may be vaporized during processing which can decrease the yield of metal in the final product. The amount of metallic salt can be increased to make up for the vaporized metal.

Plasma Processing

The dissolved salts can be well stirred and then filtered through a filter membrane with pore sizes from, for example 0.05-0.6 µm, to produce a clean solution free of sediments or insoluble impurities. The resulting solution precursor can be transferred into a vessel where it is fed into a droplet making device that sits on top of a microwave plasma torch. Embodiments of the precursor vessel include a syringe or hopper beaker. From the precursor vessel, the feedstock can be fed towards a droplet making device. Some embodiments of the droplet making device include a nebulizer and atomizer. The droplet maker can produce solution precursor droplets that are approximately equal in size with diameters ranging approximately 5%. The droplets can be fed into the microwave plasma torch, a plasma plume of the microwave plasma torch, and/or an exhaust of the microwave plasma torch.

Figure 4A:
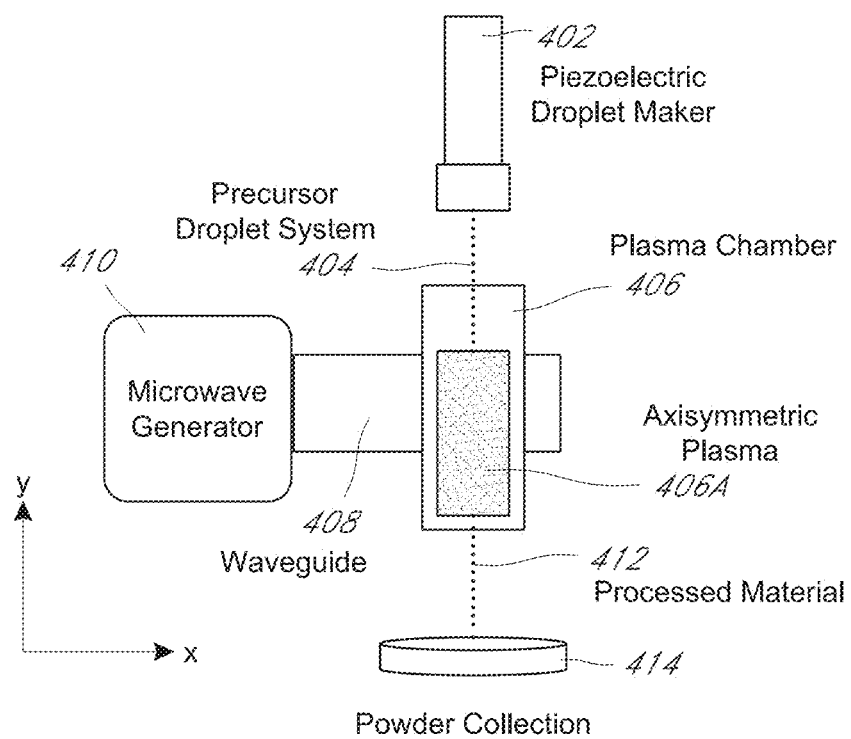
FIGS. 4A-4C illustrate an example of a microwave enhanced plasma processing system.
Figure 4C:
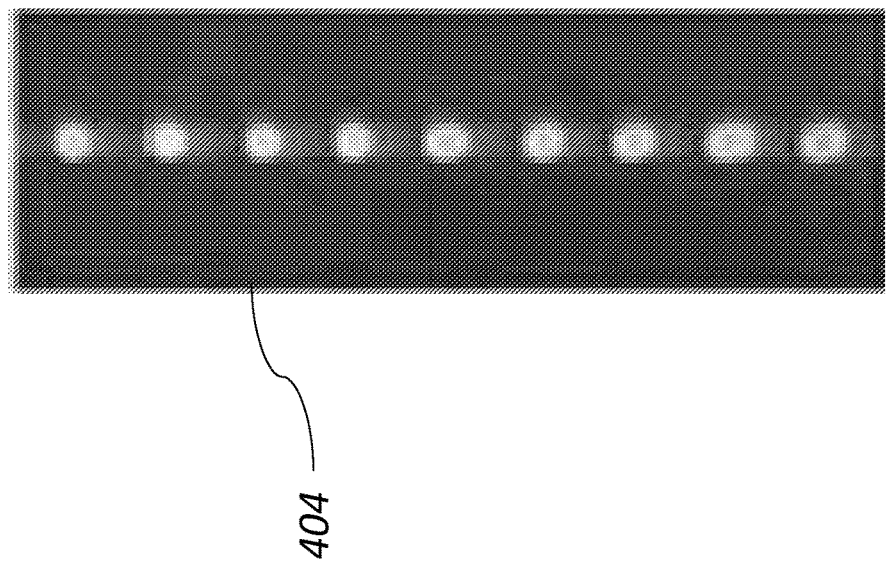
Figure 4B:
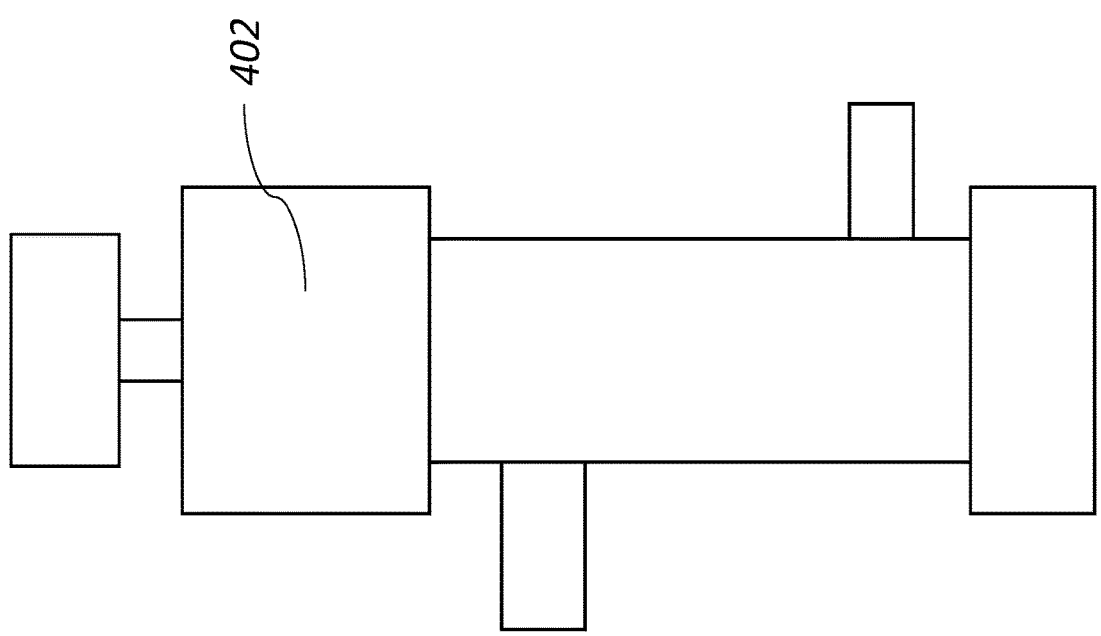

An overview of the system can be seen in FIGS. 4A-4C. FIG. 4A is a schematic view of an example implementation of the microwave plasma processing system. The system includes a droplet maker 402. FIG. 4B illustrates a view of the droplet maker 402. The droplet maker 402 may be a piezoelectric droplet maker which uses a voltage to influence a valve which opens and closes to release liquid out of the valve. The droplet maker 402 creates highly controlled droplets 404 of a controlled size. FIG. 4C illustrates a view of the droplets 404. The size of the droplets 404 correlates to the final particle size. The droplets 404 enter a plasma chamber 406. The plasma chamber 406 is connected with a waveguide 408. The waveguide 408 is connected with a microwave generator 410 which generates a microwave frequency signal through the waveguide 408. The microwave frequency signal excites gases within the plasma chamber 406 to create a plasma. In some implementations, the plasma 406 may be an axisymmetric plasma. The droplets 404 are fed into the plasma 406 where they disassociate and create particles 412. The droplets 404 may be fed through the plasma, a plasma plume, or a plasma exhaust. The particles 412 are collected within a collection bin 414.

As each droplet is heated within a plasma hot zone created by the microwave plasma torch, the solvents can evaporate, the solute can precipitate, and pyrolysis can occur. Pyrolysis under the oxygen plasma can produce an oxide compound made of lithium, lanthanum, zirconium, and dopant choices M1 and M2. The plasma gas can be oxygen but alternatively can be a blend of up to three gasses with a minimum oxygen concentration of 1%. In some embodiments, one of the up to three gasses is argon.

Figure 7A:
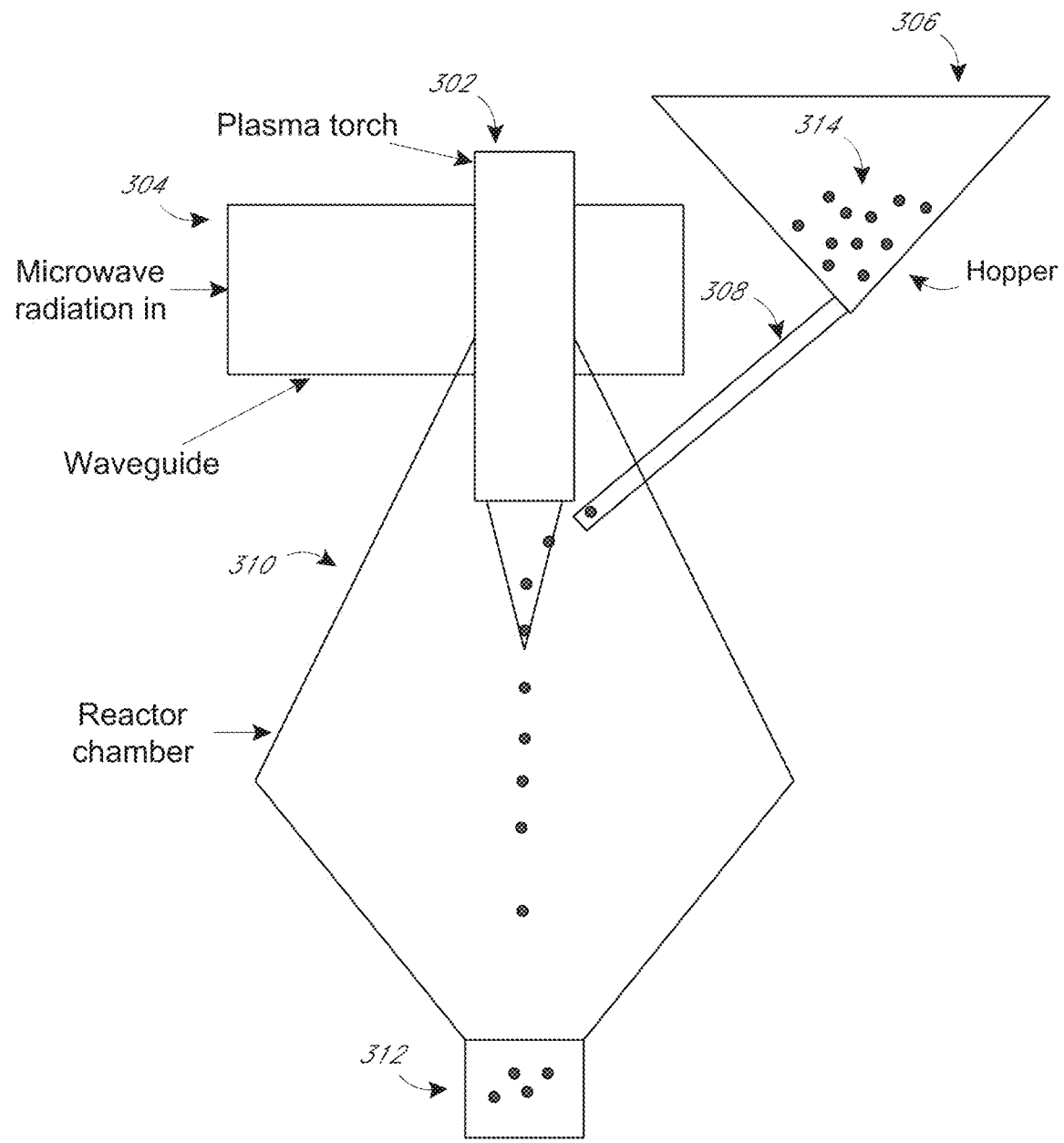
FIGS. 7A-7B illustrate embodiments of a microwave plasma torch that can be used in the production of powders, according to a side feeding hopper embodiment of the present disclosure.

In some embodiments, the droplet making device can sit to the side of the microwave plasma torch, such as shown in FIG. 7A. The feedstock material can be fed by the droplet making device from the side of the microwave plasma torch. The droplets can be fed from any direction into the microwave generated plasma.

Amorphous material can be produced after the precursor is decomposed into an oxide material and is then cooled at a rate sufficient to prevent atoms to reach a crystalline state. The cooling rate can be achieved by quenching the droplets within 0.05-2 seconds of pyrolyzation in a high velocity gas stream. The high velocity gas stream temperature can be in the range of −150° C.-40° C.

Alternatively, crystalline material can be produced when the plasma length and reactor temperature are sufficient to provide particles with the time and temperature necessary for atoms to diffuse to their thermodynamically favored crystallographic positions. The length of the plasma and reactor temperature can be tuned with parameters such as power, torch diameter, reactor length, gas flow rates, gas flow characteristics, and torch type. In some embodiments, longer plasma length can yield more crystallinity. In some embodiments, higher temperature can yield more crystallinity. In some embodiments, temperature can be adjusted to be high enough to yield crystallinity yet low enough to not melt or evaporate the particles. In some embodiments the temperature can be between 900° C. and 1600° C.

Spheroidization

In some embodiments, the final particles achieved by the plasma processing can be spherical or spheroidal, terms which can be used interchangeably. Advantageously, by using the critical and specific disclosure relevant to each of the different feedstocks disclosed, all of the feedstocks can be transformed into the spherical powders.

Embodiments of the present disclosure are directed to producing particles that are substantially spherical or spheroidal or have undergone significant spheroidization. In some embodiments, spherical, spheroidal or spheroidized particles refer to particles having a sphericity greater than a certain threshold. Particle sphericity can be calculated by calculating the surface area of a sphere $A_{s,ideal}$ with a volume matching that of the particle, V using the following equation:

$$r_{ideal} = \sqrt[3]{\frac{3\,V}{4\,\pi}}$$

$$A_{s,ideal} = 4\,\pi\,r_{ideal}^2$$

and then comparing that idealized surface area with the measured surface area of the particle, $A_{s,actual}$:

$$\text{Sphericity} = \frac{A_{s,ideal}}{A_{s,actual}}.$$

In some embodiments, particles can have a sphericity (also referred to herein as sphericity factor) of greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, particles can have a sphericity of 0.75 or greater or 0.91 or greater (or about 0.75 or greater or about 0.91 or greater). In some embodiments, particles can have a sphericity of less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a particle is considered to be spherical, spheroidal or spheroidized if it has a sphericity at or above any of the aforementioned sphericity values, and in some preferred embodiments, a particle is considered to be spherical if its sphericity is at or about 0.75 or greater or at or about 0.91 or greater.

In some embodiments, a median sphericity of all particles within a given powder can be greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, a median sphericity of all particles within a given powder can be less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a powder is considered to be spheroidized if all or a threshold percentage (as described by any of the fractions below) of the particles measured for the given powder have a median sphericity greater than or equal to any of the aforementioned sphericity values, and in some preferred embodiments, a powder is considered to be spheroidized if all or a threshold percentage of the particles have a median sphericity at or about 0.75 or greater or at or about 0.91 or greater.

In some embodiments, the fraction of particles within a powder that can be above a given sphericity threshold, such as described above, can be greater than 50%, 60%, 70%, 80%, 90%, 95%, or 99% (or greater than about 50%, about 60%, about 70%, about 80%, about 90%, about 95%, or about 99%). In some embodiments, the fraction of particles within a powder that can be above a given sphericity threshold, such as described above, can be less than 50%, 60%, 70%, 80%, 90%, 95%, or 99% (or less than about 50%, about 60%, about 70%, about 80%, about 90%, about 95%, or about 99%).

Particle size distribution and sphericity may be determined by any suitable known technique such as by SEM, optical microscopy, dynamic light scattering, laser diffraction, manual measurement of dimensions using an image analysis software, for example from about 15-30 measures per image over at least three images of the same material section or sample, and any other techniques.

Microwave Plasma Processing

The above disclosed particles/structures/powders/precursors can be used in a number of different processing procedures. For example, spray/flame pyrolysis, radiofrequency plasma processing, and high temperature spray driers can all be used.

In some cases, the feedstock may include a well-mixed slurry containing the constituent solid materials suspended in a liquid carrier medium which can be fed through a droplet making device. Some embodiments of the droplet making device include a nebulizer and atomizer. The droplet maker can produce solution precursor droplets with diameters ranging approximately 1 um-200 um. The droplets can be fed into the microwave plasma torch, a plasma plume of the microwave plasma torch, afterglow of the plasma plume, and/or an exhaust of the microwave plasma torch. As each droplet is heated within a plasma hot zone created by the microwave plasma torch, the carrier liquid is driven off and the remaining dry components melt to form a molten droplet containing the constituent elements. The plasma gas can be argon, nitrogen, helium hydrogen or a mixture thereof.

In some embodiments, the droplet making device can sit to the side of the microwave plasma torch. The feedstock material can be fed by the droplet making device from the side of the microwave plasma torch. The droplets can be fed from any direction into the microwave generated plasma.

Amorphous material can be produced after the precursor is processed into the desired material and is then cooled at a rate sufficient to prevent atoms to reach a crystalline state. The cooling rate can be achieved by quenching the material within 0.05-2 seconds of processing in a high velocity gas stream. The high velocity gas stream temperature can be in the range of −200° C.-40° C.

Alternatively, crystalline material can be produced when the plasma length and reactor temperature are sufficient to provide particles with the time and temperature necessary for atoms to diffuse to their thermodynamically favored crystallographic positions. The length of the plasma and reactor temperature can be tuned with parameters such as power (2-120 kW), torch diameter (0.5-4"), reactor length (0.5-30'), gas flow rates (1-20 CFM), gas flow characteristics (laminar or turbulent), and torch type (laminar or turbulent). Longer time at the right temperature results in more crystallinity.

The process parameters can be optimized to obtain maximum spheroidization depending on the powder initial condition. For each feedstock powder characteristic, process parameters can be optimized for a particular outcome. U.S. Pat. Pub. No. 2018/0297122, U.S. Pat. Nos. 8,748,785, and 9,932,673 disclose certain processing techniques that can be used in the disclosed process, specifically for microwave plasma processing. Accordingly, U.S. Pat. Pub. No. 2018/0297122, U.S. Pat. Nos. 8,748,785, and 9,932,673 are incorporated by reference in its entirety and the techniques describes should be considered to be applicable to the feedstock described herein.

One aspect of the present disclosure involves a process of spheroidization of metals, metal alloys, or ceramics using a microwave generated plasma. The powder feedstock is entrained in inert and/or reducing and/or oxidizing gas environment and injected into the microwave plasma environment. Upon injection into a hot plasma, the feedstock is spheroidized and released into a chamber filled with an inert gas and directed into hermetically sealed drums where is it stored. This process can be carried out at atmospheric pressure, in a partial vacuum, or at a slightly higher pressure than atmospheric pressure. In alternative embodiments, the process can be carried out in a low, medium, or high vacuum environment. The process can run continuously and the drums are replaced as they fill up with spheroidized particles.

The rate of cooling of the spheroidized metals, metal alloys, or ceramics can be controlled to strategically influence the microstructure of the powder. By controlling the process parameters such as cooling gas flow rate, residence time, cooling gas composition etc., microstructure of the metals, metal alloys, or ceramics can be controlled. The precise cooling rates required to form these structures is largely a function of the type and quantity of the alloying elements within the material.

The rate of cooling, especially when combined with the consistent and uniform heating capabilities of a microwave plasma plume, allow for control over the final microstructure. As a result, the above methods can be applied to processing metals, metal alloys, or ceramics feedstock.

Cooling processing parameters include, but are not limited to, cooling gas flow rate, residence time of the spheroidized particles in the hot zone, and the composition or make of the cooling gas. For example, the cooling rate or quenching rate of the particles can be increased by increasing the rate of flow of the cooling gas. The faster the cooling gas is flowed past the spheroidized particles exiting the plasma, the higher the quenching rate-thereby allowing certain desired microstructures to be locked-in.

Residence time of the particles within the hot zone of the plasma can also be adjusted to provide control over the resulting microstructure. That is, the length of time the particles are exposed to the plasma determines the extent of melting of the particle (i.e., surface of the particle melted as compared to the inner most portion or core of the particle). Consequently, the extent of melting effects the extent of cooling needed for solidification and thus it is a cooling process parameter.

Microstructural changes can be incorporated throughout the entire particle or just a portion thereof depending upon the extent of particle melting. Residence time can be adjusted by adjusting such operating variables of particle injection rate and flow rate (and conditions, such as laminar flow or turbulent flow) within the hot zone. Equipment changes can also be used to adjust residence time. For example, residence time can be adjusted by changing the cross-sectional area of the hot zone.

Another cooling processing parameter that can be varied or controlled is the composition of the cooling gas. Certain cooling gases are more thermally conductive than others. For example helium is considered to be a highly thermally conductive gas. The higher the thermal conductivity of the cooling gas, the faster the spheroidized particles can be cooled/quenched. By controlling the composition of the cooling gas (e.g., controlling the quantity or ratio of high thermally conductive gasses to lesser thermally conductive gases) the cooling rate can be controlled.

The microstructure of a metal, metal alloy, or ceramic can be determined by the composition of the material and heating and cooling/quenching of the material. By selecting (or knowing) the composition of the feedstock material, and then exposing the feedstock to a plasma that has the uniform temperature profile and control there over as provided by the microwave plasma torch, followed by selecting and controlling the cooling parameters control over the microstructure of the spheroidized particle is achieved. In addition, the phase of the material can depend upon the compositions of the feed stock material (e.g., purity, composition of alloying elements, etc.) as well thermal processing.

In one exemplary embodiment, inert gas is continually purged surrounding a powdered metals, metal alloys, or ceramics feed to remove oxygen within a powder-feed hopper. A continuous volume of powder feed is then entrained within an inert gas and fed into the microwave generated plasma for dehydrogenation or for composition/maintaining purity of the spheroidized particles. In one example, the microwave generated plasma may be generated using a microwave plasma torch, as described in U.S. Patent Publication No. US 2013/0270261, and/or U.S. Pat. Nos. 8,748,785, 9,023,259, 9,206,085, 9,242,224, and 10,477,665, each of which is hereby incorporated by reference in its entirety.

In some embodiments, the particles are exposed to a uniform temperature profile at between 4,000 and 8,000 K within the microwave generated plasma. In some embodiments, the particles are exposed to a uniform temperature profile at between 3,000 and 8,000 K within the microwave generated plasma. Within the plasma torch, the powder particles are rapidly heated and melted. In some embodiments, liquid convection accelerates $H_2$ diffusion throughout the melted particle, continuously bringing hydrogen ($H_2$) to the surface of the liquid metal hydride where it leaves the particle, reducing the time each particle is required to be within the process environment relative to solid-state processes. As the particles within the process are entrained within an inert gas, such as argon, generally contact between particles is minimal, greatly reducing the occurrence of particle agglomeration. The need for post-process sifting is thus greatly reduced or eliminated, and the resulting particle size distribution could be practically the same as the particle size distribution of the input feed materials. In exemplary embodiments, the particle size distribution of the feed materials is maintained in the end products.

Within the plasma, the melted particles are inherently spheroidized due to liquid surface tension. As the microwave generated plasma exhibits a substantially uniform temperature profile, more than 90% spheroidization of particles could be achieved (e.g., 91%, 93%, 95%, 97%, 99%, 100%). After exiting the plasma, the particles are cooled before entering collection bins. When the collection bins fill, they can be removed and replaced with an empty bin as needed without stopping the process.

Figure 5:
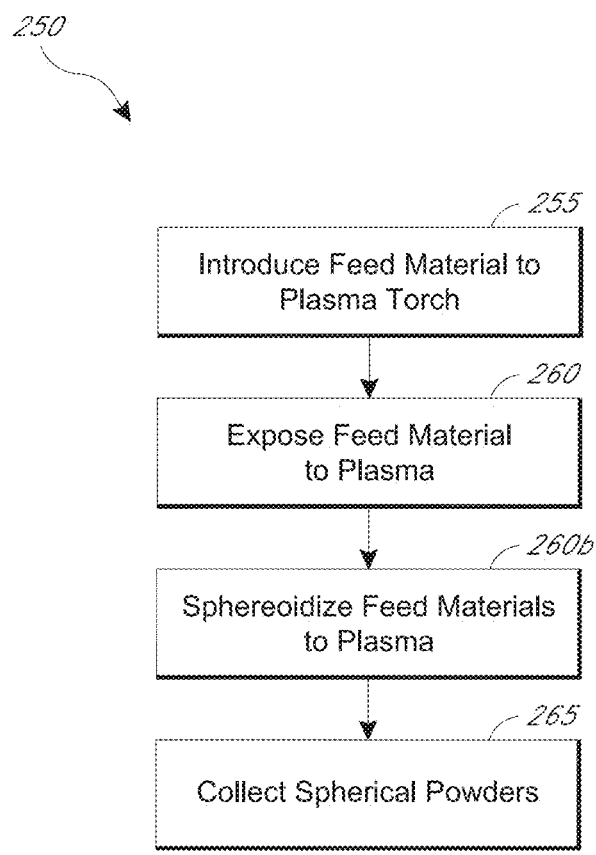
FIG. 5 illustrates an example embodiment of a method of producing powders according to the present disclosure.

FIG. 5 is a flow chart illustrating an exemplary method (250) for producing spherical powders, according to an embodiment of the present disclosure. In this embodiment, the process (250) begins by introducing a feed material into a plasma torch (255). In some embodiments, the plasma torch is a microwave generated plasma torch or an RF plasma torch. Within the plasma torch, the feed materials are exposed to a plasma causing the materials to melt, as described above (260). The melted materials are spheroidized by surface tension, as discussed above (260b). After exiting the plasma, the products cool and solidify, locking in the spherical shape and are then collected (265).

In some embodiments, the environment and/or sealing requirements of the bins are carefully controlled. That is, to prevent contamination or potential oxidation of the powders, the environment and or seals of the bins are tailored to the application. In one embodiment, the bins are under a vacuum. In one embodiment, the bins are hermetically sealed after being filled with powder generated in accordance with the present technology. In one embodiment, the bins are back filled with an inert gas, such as, for example argon. Because of the continuous nature of the process, once a bin is filled, it can be removed and replaced with an empty bin as needed without stopping the plasma process.

The methods and processes in accordance with the disclosure can be used to make powders, such as spherical powders.

In some embodiments, the processing discussed herein, such as the microwave plasma processing, can be controlled to prevent and/or minimize certain elements for escaping the feedstock during the melt, which can maintain the desired composition/microstructure.

Figure 6:
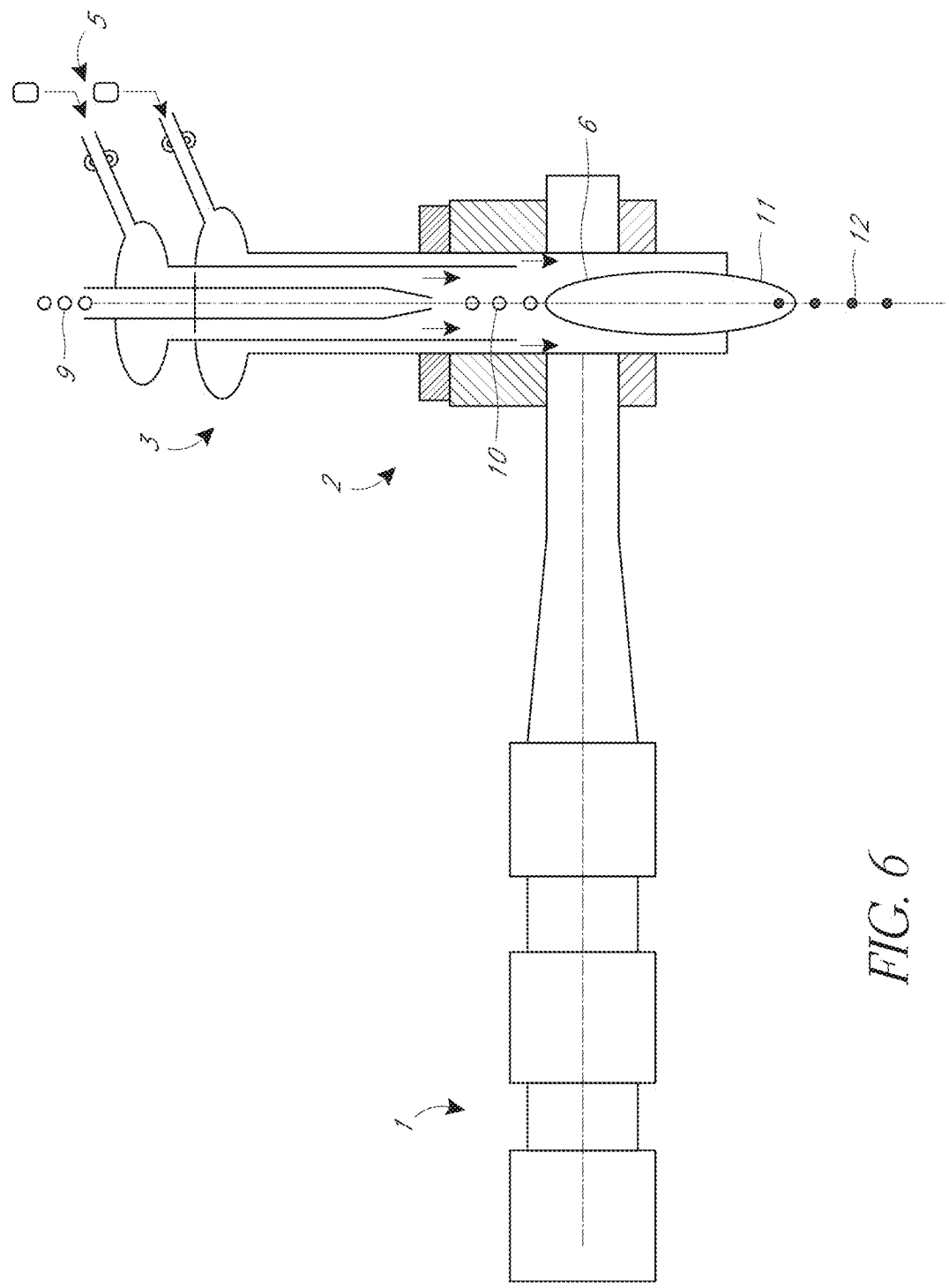
FIG. 6 illustrates an embodiment of a microwave plasma torch that can be used in the production of powders, according to embodiments of the present disclosure.

FIG. 6 illustrates an exemplary microwave plasma torch that can be used in the production of powders, according to embodiments of the present disclosure. As discussed above, feed materials 9, 10 can be introduced into a microwave plasma torch 3, which sustains a microwave generated plasma 11. In one example embodiment, an entrainment gas flow and a sheath flow (downward arrows) may be injected through inlets 5 to create flow conditions within the plasma torch prior to ignition of the plasma 11 via microwave radiation source 1.

In some embodiments, the entrainment flow and sheath flow are both axis-symmetric and laminar, while in other embodiments the gas flows are swirling. The feed materials 9 are introduced axially into the microwave plasma torch, where they are entrained by a gas flow that directs the materials toward the plasma. As discussed above, the gas flows can consist of a noble gas column of the periodic table, such as helium, neon, argon, etc. Within the microwave generated plasma, the feed materials are melted in order to spheroidize the materials. Inlets 5 can be used to introduce process gases to entrain and accelerate particles 9, 10 along axis 12 towards plasma 11. First, particles 9 are accelerated by entrainment using a core laminar gas flow (upper set of arrows) created through an annular gap within the plasma torch. A second laminar flow (lower set of arrows) can be created through a second annular gap to provide laminar sheathing for the inside wall of dielectric torch 3 to protect it from melting due to heat radiation from plasma 11. In exemplary embodiments, the laminar flows direct particles 9, 10 toward the plasma 11 along a path as close as possible to axis 12, exposing them to a substantially uniform temperature within the plasma.

In some embodiments, suitable flow conditions are present to keep particles 10 from reaching the inner wall of the plasma torch 3 where plasma attachment could take place. Particles 9, 10 are guided by the gas flows towards microwave plasma 11 were each undergoes homogeneous thermal treatment. Various parameters of the microwave generated plasma, as well as particle parameters, may be adjusted in order to achieve desired results. These parameters may include microwave power, feed material size, feed material insertion rate, gas flow rates, plasma temperature, residence time and cooling rates. In some embodiments, the cooling or quenching rate is not less than $10^{+3}$ degrees C./sec upon exiting plasma 11. As discussed above, in this particular embodiment, the gas flows are laminar; however, in alternative embodiments, swirl flows or turbulent flows may be used to direct the feed materials toward the plasma.

Figure 7B:
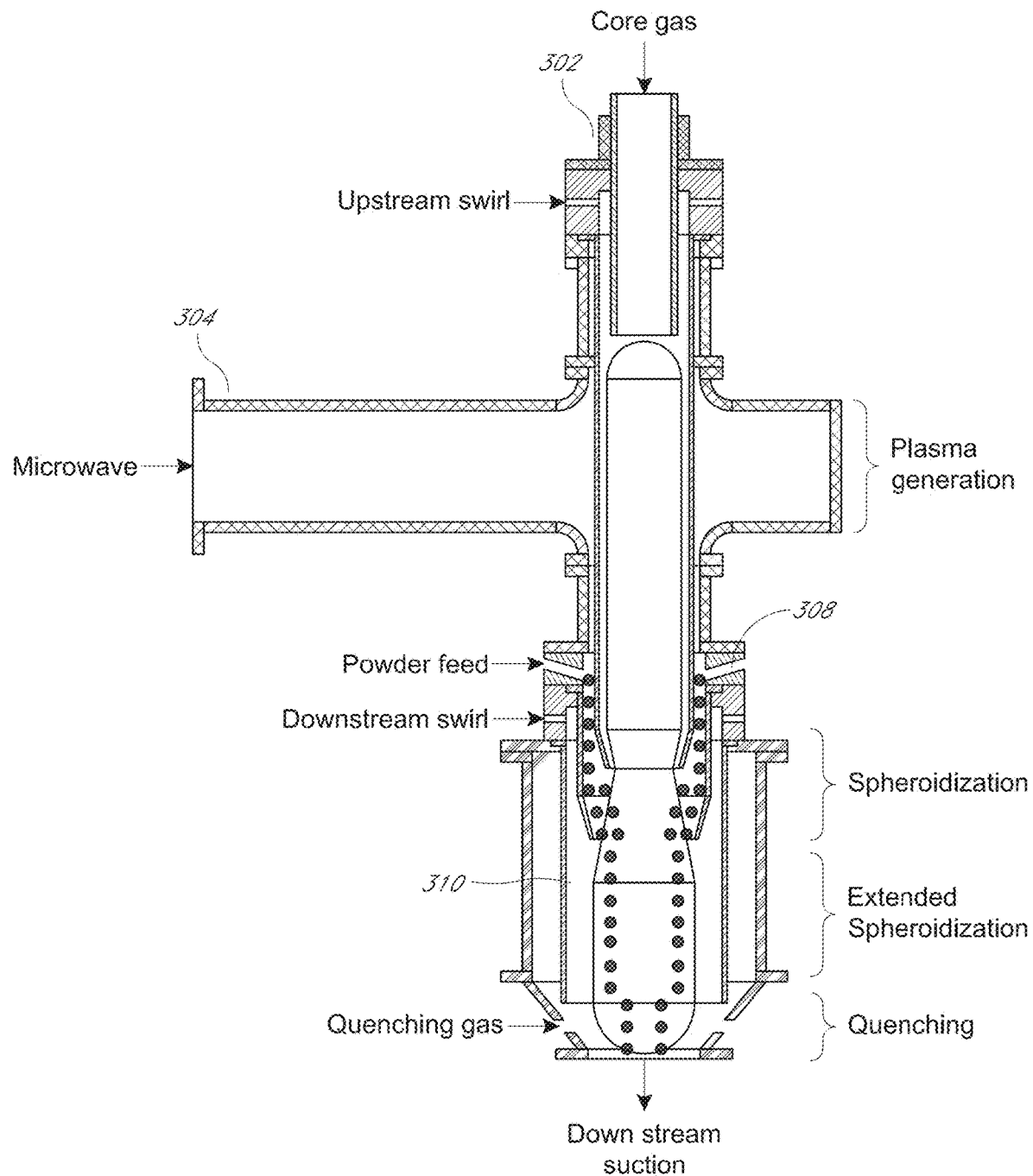

FIGS. 7A-B illustrates an exemplary microwave plasma torch that includes a side feeding hopper rather than the top feeding hopper shown in the embodiment of FIG. 6, thus allowing for downstream feeding. Thus, in this implementation the feedstock is injected after the microwave plasma torch applicator for processing in the "plume" or "exhaust" of the microwave plasma torch. Thus, the plasma of the microwave plasma torch is engaged at the exit end of the plasma torch to allow downstream feeding of the feedstock, as opposed to the top-feeding (or upstream feeding) discussed with respect to FIG. 6. This downstream feeding can advantageously extend the lifetime of the torch as the hot zone is preserved indefinitely from any material deposits on the walls of the hot zone liner. Furthermore, it allows engaging the plasma plume downstream at temperature suitable for optimal melting of powders through precise targeting of temperature level and residence time. For example, there is the ability to dial the length of the plume using microwave powder, gas flows, and pressure in the quenching vessel that contains the plasma plume.

Generally, the downstream spheroidization method can utilize two main hardware configurations to establish a stable plasma plume which are: annular torch, such as described in U.S. Pat. Pub. No. 2018/0297122, or swirl torches described in U.S. Pat. No. 8,748,785 B2 and U.S. Pat. No. 9,932,673 B2. Both FIG. 7A and FIG. 7B show embodiments of a method that can be implemented with either an annular torch or a swirl torch. A feed system close-coupled with the plasma plume at the exit of the plasma torch is used to feed powder axisymmetrically to preserve process homogeneity.

Other feeding configurations may include one or several individual feeding nozzles surrounding the plasma plume. The feedstock powder can enter the plasma at a point from any direction and can be fed in from any direction, 360° around the plasma, into the point within the plasma. The feedstock powder can enter the plasma at a specific position along the length of the plasma plume where a specific temperature has been measured and a residence time estimated for sufficient melting of the particles. The melted particles exit the plasma into a sealed chamber where they are quenched then collected.

The feed materials 314 can be introduced into a microwave plasma torch 302. A hopper 306 can be used to store the feed material 314 before feeding the feed material 314 into the microwave plasma torch 302, plume, or exhaust. The feed material 314 can be injected at any angle to the longitudinal direction of the plasma torch 302. 5, 10, 15, 20, 25, 30, 35, 40, 45, 50, or 55 degrees. In some embodiments, the feedstock can be injected an angle of greater than 5, 10, 15, 20, 25, 30, 35, 40, 45, 50, or 55 degrees. In some embodiments, the feedstock can be injected an angle of less than 5, 10, 15, 20, 25, 30, 35, 40, 45, 50, or 55 degrees. In alternative embodiments, the feedstock can be injected along the longitudinal axis of the plasma torch.

The microwave radiation can be brought into the plasma torch through a waveguide 304. The feed material 314 is fed into a plasma chamber 310 and is placed into contact with the plasma generated by the plasma torch 302. When in contact with the plasma, plasma plume, or plasma exhaust, the feed material melts. While still in the plasma chamber 310, the feed material 314 cools and solidifies before being collected into a container 312. Alternatively, the feed material 314 can exit the plasma chamber 310 while still in a melted phase and cool and solidify outside the plasma chamber. In some embodiments, a quenching chamber may be used, which may or may not use positive pressure. While described separately from FIG. 6, the embodiments of FIGS. 7A-7B are understood to use similar features and conditions to the embodiment of FIG. 6.

In some embodiments, implementation of the downstream injection method may use a downstream swirl, extended spheroidization, or quenching. A downstream swirl refers to an additional swirl component that can be introduced downstream from the plasma torch to keep the powder from the walls of the tube. An extended spheroidization refers to an extended plasma chamber to give the powder longer residence time. In some implementations, it may not use a downstream swirl, extended spheroidization, or quenching. In some embodiments, it may use one of a downstream swirl, extended spheroidization, or quenching. In some embodiments, it may use two of a downstream swirl, extended spheroidization, or quenching.

Injection of powder from below may result in the reduction or elimination of plasma-tube coating in the microwave region. When the coating becomes too substantial, the microwave energy is shielded from entering the plasma hot zone and the plasma coupling is reduced. At times, the plasma may even extinguish and become unstable. Decrease of plasma intensity means decreases in spheroidization level of the powder. Thus, by feeding feedstock below the microwave region and engaging the plasma plume at the exit of the plasma torch, coating in this region is eliminated and the microwave powder to plasma coupling remains constant through the process allowing adequate spheroidization.

Thus, advantageously the downstream approach may allow for the method to run for long durations as the coating issue is reduced. Further, the downstream approach allows for the ability to inject more powder as there is no need to minimize coating.

From the foregoing description, it will be appreciated that inventive LLZO powders and methods of manufacturing are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A lithium lanthanum zirconium oxide (LLZO) powder comprising:
LLZO particles;
wherein the LLZO particles are produced by plasma processing;
wherein the LLZO particles have a D50 between about 20 nm and about 500 nm, D10 of greater than or equal to D50÷4, and D90 less than or equal to D50×4;
wherein the LLZO particles have a sphericity factor of greater than about 0.6, and
wherein a structure of the LLZO particles is a crystalline garnet structure and/or an amorphous structure.

2. The LLZO powder of claim 1, wherein the D10 is approximately equal to D50÷2.

3. The LLZO powder of claim 1, wherein the D90 is approximately equal to D50×2.

4. The LLZO powder of claim 1, wherein the LLZO particles have a D50 between about 50 nm and about 500 nm.

5. The LLZO powder of claim 1, wherein the D50 is between about 100 nm and about 400 nm.

6. The LLZO powder of claim 1, wherein the D50 is between about 150 nm to about 300 nm.

7. The LLZO powder of claim 1, wherein the LLZO particles have a stoichiometry of $Li_{7-3x}M1_xLa_3Zr_2O_{12}$, M1 is Al, B, Ga, and x is about 0.1 to 0.3.

8. The LLZO powder of claim 1, wherein the LLZO particles have a stoichiometry of $Li_{7-y}La_3Zr_{2-y}M2_yO_{12}$, M2 is Ta or Nb, and y greater than or equal to about 0.4.

9. The LLZO powder of claim 1, wherein the LLZO particles have a stoichiometry of $Li_{7-3nx}M1_xLa_3Zr_{2-my}M2_yO_{12}$, M1 is a low atomic mass metal, x is about 0.1 to 0.3, and n can depend on the valence of M1.

10. The LLZO powder of claim 1, wherein the LLZO particles have a stoichiometry of $Li_{7-3nx}M1_xLa_3Zr_{2-my}M2_yO_{12}$, y greater than or equal to about 0.4, and m can depend on the valence of M2.

11. The LLZO powder of claim 1, wherein the LLZO particles are crystalline.

12. The LLZO powder of claim 11, wherein the crystalline structure of the LLZO particles is a garnet crystalline structure.

13. A solid state battery comprising:
an anode;
a cathode;
a solid electrolyte; and
a separator;
wherein either the anode, cathode or separator comprises LLZO particles;
wherein the LLZO particles are produced by plasma processing;
wherein the LLZO particles have a D50 between about 20 and about 500 nm, D10 of greater than or equal to D50÷4, and D90 less than or equal to D50×4;
wherein the LLZO particles have a sphericity factor of greater than about 0.6, and
wherein a structure of the LLZO particles is a crystalline garnet structure.

14. The solid state battery of claim 13, wherein the separator comprises the LLZO particles.

15. The solid state battery of claim 14, wherein the separator is a composite or a ceramic non-composite separator.

16. The LLZO powder of claim 1, wherein the LLZO particles have a stoichiometry of $Li_{7-3x}M1_xLa_3Zr_2O_{12}$, M1 is Al, and x is about 0.1 to 0.3.

17. The LLZO powder of claim 1, wherein the LLZO particles have a stoichiometry of $Li_{7-3x}M1_xLa_3Zr_2O_{12}$, M1 is B, and x is about 0.1 to 0.3.

* * * * *